US009866323B2

(12) United States Patent
Roberts et al.

(10) Patent No.: US 9,866,323 B2
(45) Date of Patent: Jan. 9, 2018

(54) TECHNIQUES FOR OPTICAL WIRELESS COMMUNICATION

(71) Applicant: Intel Corporation, Santa Clara, CA (US)

(72) Inventors: Richard D. Roberts, Hillsboro, OR (US); Javier Perez-Ramirez, Beaverton, OR (US); Parmoon Seddighrad, Portland, OR (US); Roni Abiri, Raanana (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/088,897

(22) Filed: Apr. 1, 2016

(65) Prior Publication Data
US 2017/0187455 A1 Jun. 29, 2017

Related U.S. Application Data

(60) Provisional application No. 62/272,218, filed on Dec. 29, 2015.

(51) Int. Cl.
*H04B 10/00* (2013.01)
*H04B 10/116* (2013.01)
(Continued)

(52) U.S. Cl.
CPC ......... *H04B 10/116* (2013.01); *H04B 10/524* (2013.01); *H04B 10/58* (2013.01);
(Continued)

(58) Field of Classification Search
USPC ................................. 398/202–214
See application file for complete search history.

(56) References Cited

U.S. PATENT DOCUMENTS 4,344,180 A * 8/1982 Cummiskey .......... H04J 3/0602
370/511
4,355,423 A * 10/1982 Theall .................... H04L 25/22
375/282
(Continued)

FOREIGN PATENT DOCUMENTS

WO   2012002431 A1   1/2012
WO   2017/116604 A1   7/2017

OTHER PUBLICATIONS

International Search Report and Written Opinion received for International Application No. PCT/US2016/064384, dated Mar. 16, 2017, 12 pages.

*Primary Examiner* — Agustin Bello
(74) *Attorney, Agent, or Firm* — Alpine Technology Law Group LLC

(57) ABSTRACT

Optical wireless communication techniques are described and claimed. In one embodiment, the disclosure relates to method and apparatus to provide optical signaling with visible light having variable pulse position modulation (VPPM). The optical signal includes a Start Frame Delimiter (SFD) which indicates beginning of an asynchronous optical signaling. The VPPM signaling includes a lower frequency time varying amplitude component that when subsampled by a low frame rate camera results in alias induced flicker or blinking. Such signals are quickly recognizable as signals with modulated data. In another embodiment, the disclosure provides a system, device and method for decoding a Start Frame Delimiter (SFD) to indicate arrival of incoming VPPM optical data.

11 Claims, 30 Drawing Sheets

(51) Int. Cl.
    *H04B 10/524* (2013.01)
    *H04B 10/58* (2013.01)
    *H04B 10/61* (2013.01)
    *H04L 7/00* (2006.01)

(52) U.S. Cl.
    CPC ......... *H04B 10/612* (2013.01); *H04B 10/616* (2013.01); *H04L 7/0075* (2013.01)

(56) References Cited

U.S. PATENT DOCUMENTS

| | | | | |
|---|---|---|---|---|
| 4,882,776 A * | 11/1989 | Uzawa | ............... | H04N 1/00111 348/833 |
| 5,295,012 A * | 3/1994 | Wilson | ................. | H04J 3/0614 370/452 |
| 5,517,518 A * | 5/1996 | Morson | ................ | H04B 1/708 375/152 |
| 5,710,774 A * | 1/1998 | Suh | ....................... | H04J 3/0608 370/513 |
| 5,808,760 A * | 9/1998 | Gfeller | .............. | H04B 10/1143 340/13.24 |
| 7,082,425 B2 | 7/2006 | Guy et al. | | |
| 7,376,152 B2 * | 5/2008 | Saado | .................... | H04J 3/0605 370/474 |
| 7,953,324 B2 * | 5/2011 | Leung | .................... | H04L 7/042 398/58 |
| 7,991,296 B1 * | 8/2011 | Johnston | ............... | H04J 3/0608 398/154 |
| 8,406,633 B1 * | 3/2013 | Johnston | ............... | H04J 3/0608 398/154 |
| 8,818,204 B2 * | 8/2014 | Roberts | .............. | H04B 10/1143 359/276 |
| 8,855,249 B2 * | 10/2014 | Nemeth | .............. | H04B 1/7077 375/343 |
| 8,861,976 B2 | 10/2014 | Roberts et al. | | |
| 9,065,629 B2 * | 6/2015 | Helmschmidt | ......... | H04L 7/042 |
| 9,148,250 B2 | 9/2015 | Roberts et al. | | |
| 9,178,615 B2 * | 11/2015 | Roberts | ................ | H04B 10/116 |
| 9,203,541 B2 * | 12/2015 | Roberts | ................ | H04J 14/00 |
| 2002/0054409 A1 * | 5/2002 | Bartur | .................... | H04B 10/40 398/139 |
| 2002/0172103 A1 * | 11/2002 | Yamawaki | ............. | G11B 20/18 369/30.11 |
| 2003/0086366 A1 * | 5/2003 | Branlund | ........... | H04B 1/71052 370/208 |
| 2003/0156603 A1 * | 8/2003 | Rakib | ................. | H03M 13/256 370/485 |
| 2004/0005023 A1 * | 1/2004 | Ham | ....................... | H04L 7/046 375/368 |
| 2004/0196926 A1 * | 10/2004 | Chien | .................... | H04L 7/042 375/316 |
| 2005/0123069 A1 * | 6/2005 | Akasaka | ................ | H04L 7/0331 375/316 |
| 2008/0187085 A1 * | 8/2008 | Nuth | .................... | H04L 7/0338 375/372 |
| 2008/0232509 A1 * | 9/2008 | Jonsson | ................. | H04L 7/043 375/296 |
| 2009/0097588 A1 * | 4/2009 | El-Agha | ............. | H04J 3/0602 375/295 |
| 2014/0003823 A1 * | 1/2014 | Roberts | ............. | H04B 10/5563 398/187 |
| 2014/0006907 A1 | 1/2014 | Roberts et al. | | |
| 2014/0093238 A1 | 4/2014 | Roberts | | |
| 2014/0093249 A1 | 4/2014 | Roberts et al. | | |
| 2014/0219663 A1 | 8/2014 | Roberts | | |
| 2014/0270799 A1 | 9/2014 | Roberts et al. | | |
| 2014/0308048 A1 * | 10/2014 | Roberts | ................... | H04L 27/10 398/187 |
| 2015/0092791 A1 * | 4/2015 | Cornett | ................. | H04L 1/0002 370/468 |
| 2015/0280817 A1 | 10/2015 | Roberts | | |
| 2016/0047888 A1 | 2/2016 | Roberts | | |
| 2016/0191163 A1 * | 6/2016 | Preston | ................ | G01B 11/161 398/16 |
| 2017/0085337 A1 * | 3/2017 | Cornett | ................ | H04L 1/0002 |

* cited by examiner

TECHNIQUES FOR OPTICAL WIRELESS COMMUNICATION

The instant application claims priority to the U.S. Provisional Patent Application Ser. No. 62/272,218, filed Dec. 29, 2015; the specification of which is incorporated herein in its entirety.

BACKGROUND

Field

Wireless communication is the transfer of information between two or more points that are not connected by an electrical conductor. Optical communication is a form of wireless communication that uses light to carry information. Optical wireless communications is a form of optical communication in which unguided visible, infrared (IR), or ultraviolet (UV) light is used to carry communication signals.

A composite optical waveform consists of two parts. A lower frequency time varying amplitude component that, when subsampled by a low frame rate camera, results in alias induced flicker or blinking (also known as "twinkle") which is useful for quickly identifying which light sources are modulated with data. And a high data rate portion using variable pulse position modulation (VPPM) that varies the duty cycle of the pulses to generate the lower frequency time varying amplitude component while simultaneously sending higher rate data via pulse position modulation (PPM). This high rate VPPM waveform is Nyquist sampled by a high frame rate camera, using region-of-interest subsampling, to extract the high rate data. This higher rate VPPM data transmission from an LED light source is asynchronous with respect to the receiving camera; that is, the data rate timing clocks are close in frequency but they are not frequency synchronous. As is typical of asynchronous communication of this type (e.g., RS-232), the beginning of a data packet is distinguished by a start frame delimiter (SFD) which is used to establish quasi-stationary timing for the duration of the relatively short data packet.

There is a need to satisfy the demands of the composite waveform by initiating appropriate decoding of the higher rate VPPM data packet while supporting the lower frequency amplitude envelope twinkle.

DETAILED DESCRIPTION

Various embodiments are generally directed to an apparatus, system, and method for improved optical wireless communication techniques. Various embodiments enable more efficient optical wireless communication between signal transmitters, such as light emitting diodes, and a signal receiver, such as a camera, by using a composite waveform. Various embodiments enable a first component of the composite waveform to indicate a second component of the composite waveform is modulated with data. Various embodiments enable the first component of the composite waveform to be decoded by a signal receiver operating at a low frequency (e.g. 1-1,000 Hz). Various embodiments enable the second component of the composite waveform to be decoded by a signal receiver operating at a high frequency (e.g. 1-1,000 kHz).

In some embodiments, the first component of the composite waveform may include a lower frequency time varying amplitude component to enable quick identification of signal sources modulated with data. In various embodiments, the second component of the composite waveform may include a higher frequency pulse position modulated component to enable high rate data communication. In various such embodiments, the higher frequency pulse position modulated component may use variable pulse position modulation (VPPM) to vary the duty cycle of pulses to generate the lower frequency time varying amplitude component.

Various embodiments of the protocols described herein may be used in conjunction with random access networks, networks that operate in unlicensed bands, and/or networks that operate in accordance with one or more standards, such as the Institute of Electrical and Electronics Engineers (IEEE) 802.11, 802.15, and/or 802.11ay standards.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1A:
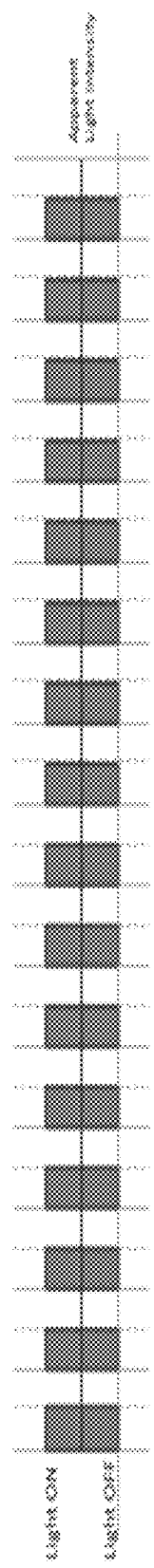
FIGS. 1A-B illustrates exemplary waveforms utilized by an optical wireless communication system.
Figure 1B:
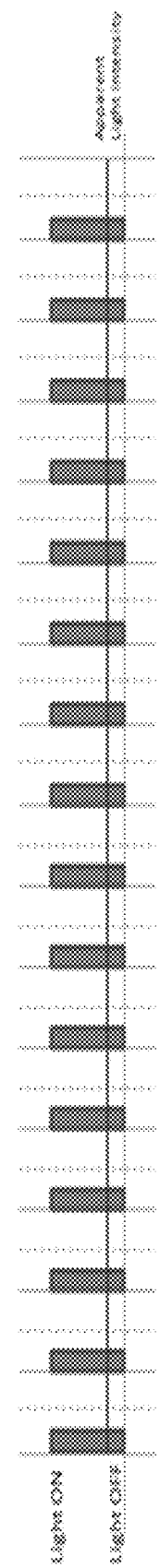

FIG. 1A illustrates an example of a waveform transmitted by an optical wireless communication system. In optical wireless communication a signal source that generates visible light, such as an LED, may be pulsed ON and OFF to send data. The pulsing may be at a rate that can be seen or not be seen by a human being. When the pulsation frequency of the light exceeds the flicker perception frequency of the human eye, the person sees only the average light intensity of the signal source. As can be seen in FIG. 1B, if the duty cycle of pulsation, at a frequency that exceeds the flicker perception frequency, is changed then the signal source appears to proportionally change average intensity.

Figure 2A:
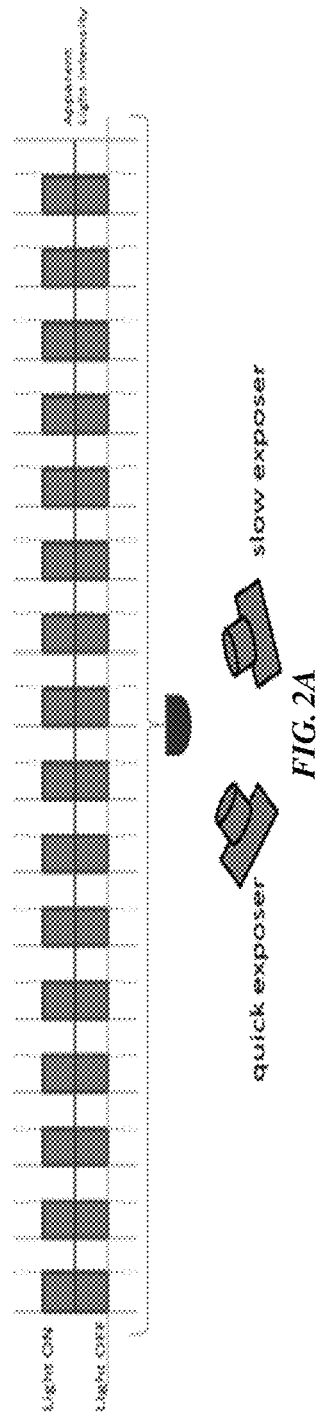
FIGS. 2A-C illustrate exemplary waveforms in conjunction with cameras, an example of a waveform received by an optical wireless communication system.

FIG. 2A illustrates an example of a waveform received by an optical wireless communication system. When viewed by a signal receiver, such as a camera, instead of the human eye, the same principle can apply, and may be controlled by the setting of the camera exposer integration time. When the exposure time is long then the camera may only respond to low frequency flicker. However, when the exposer time is sufficiently short then the camera may respond to the individual high rate pulses. This technique may enable use of a composite waveform. The composite waveform may include first and second components. The first component may identify whether or not the second component is modulated with data. This may increase the efficiency of optical wireless communication systems.

Generally a camera, when processing a complete frame of pixels, has a relatively low frame rate (e.g., ~30 frames per second (FPS)) which sets the Nyquist sampling rate for the camera operating in this mode. In some embodiments, the low frame rate can decode the first component of the composite waveform. However, by processing a subset of the pixels, called the region-of-interest (ROI), the camera may significantly increase the frame rate such that the resulting Nyquist sampling rate is high enough to be able to individually decode the second component of the composite waveform. In some embodiments the second component includes high rate data pulses.

Figure 2B:
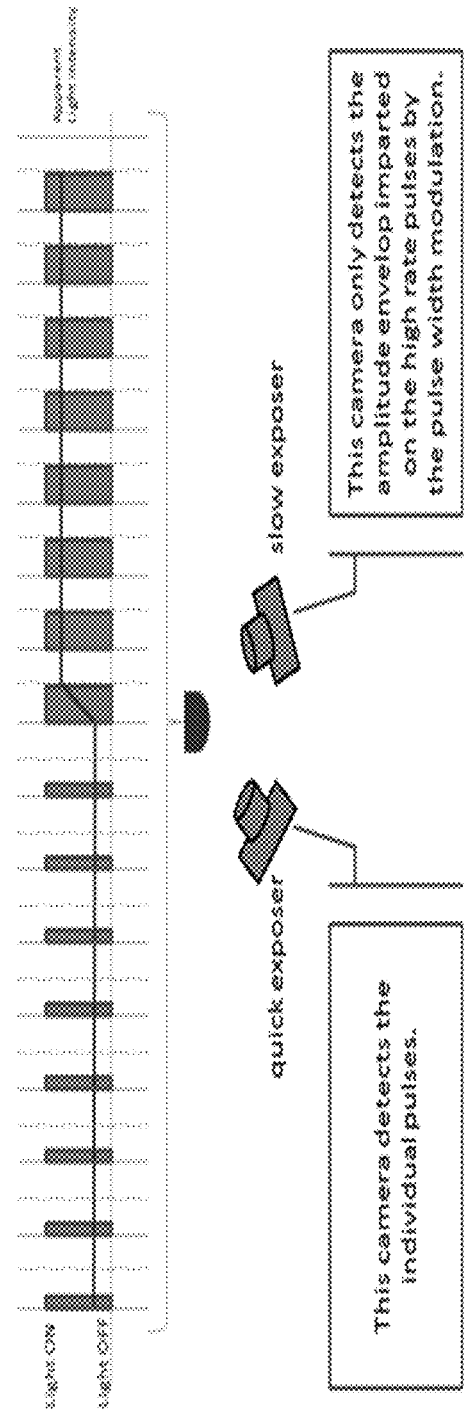

Referring to FIG. 2B, two cameras may observe the pulsating light. A first camera may have a quick exposer such that it can decode the high rate pulsing. A second camera may have a slow exposer time such that it only perceives a light with a constant intensity.

When the high rate pulse duty cycle is varied in a period manner, at a sufficiently low frequency, then the first camera may still only detect the high rate pulses, while the second camera may detect that the light has a time variant intensity at the lower frequency.

Figure 2C:
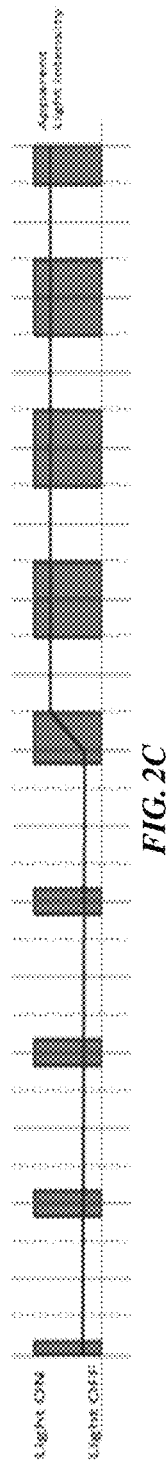

With reference to FIG. 2C, the high rate pulses may use a form of pulse position modulation (PPM) called variable PPM to encode data while accommodating pulse width modulation (PWM). In some embodiments this may utilize Manchester encoding.

When a pulse occurs in the first half of a bit time (e.g. light ON), then that may be encoded as one logic level. When the pulse occurs in the second half of a bit time then that may be encoded as the other logic level. In some embodiments, the pulse width may not be relevant when compared to the pulse position within the bit time.

Accordingly, in some embodiments, a camera with a sufficiently long exposure time (or human eye) may see a light that is flickering at a lower frequency. Yet a camera with a sufficiently short exposure time, along with knowledge of bit timing, may ascertain the position of the pulse within the bit time slot. In various embodiments the optical wireless communication system may then make a bit decision therefrom.

Figure 3:
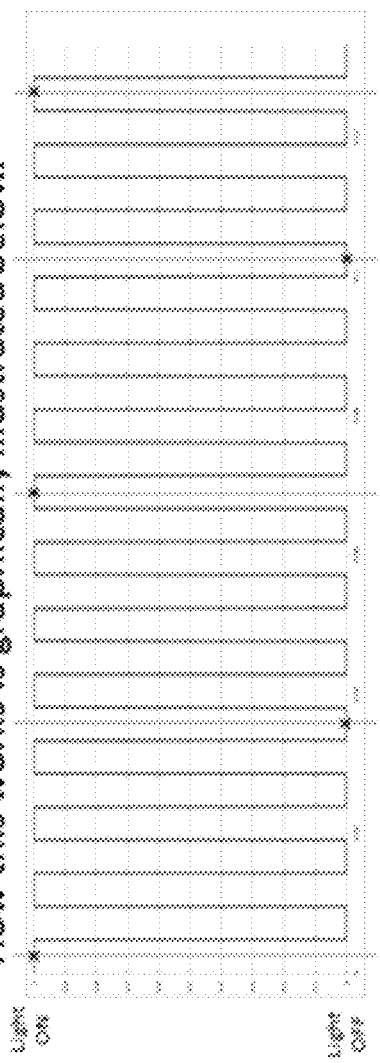
FIG. 3 illustrates an embodiment of a waveform utilized by an optical wireless communication system.

With reference to FIG. 3, in some embodiments, the frequency of the PWM induced amplitude waveform may be adjusted to either be visible by both a human and slow exposure. In other embodiments, the waveform may be adjusted to only be visible by the camera. In other such embodiments, the PWM induced flicker may be set at a frequency slightly above that observable by a human being. For example, if the PWM induced flicker is at a frequency of 10 Hz, then both a human and a camera may see the flicker. However, when the flicker frequency is at a frequency of 105 Hz, then a human could not see the flicker while the camera may still detect the flicker through a process called sub-sampling aliasing.

For example, using a 30 fps camera, with a sufficiently short exposure setting that can detect the 105 Hz flicker, the 105 Hz is aliased to 15 Hz by the following equation:

$$105-3*30=105-90=15 \text{ Hertz}$$

Figure 4A:
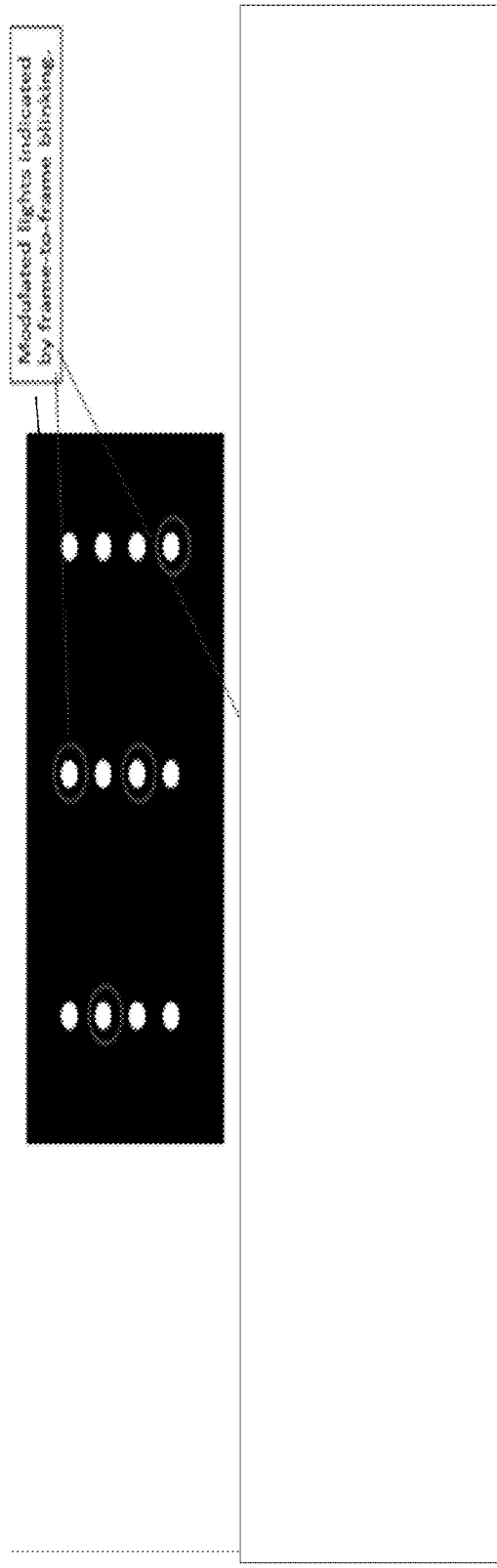
FIGS. 4A-B illustrate an example of modulated lights indicated by frame-to-frame blinking such as may be representative of various embodiments.
Figure 4B:
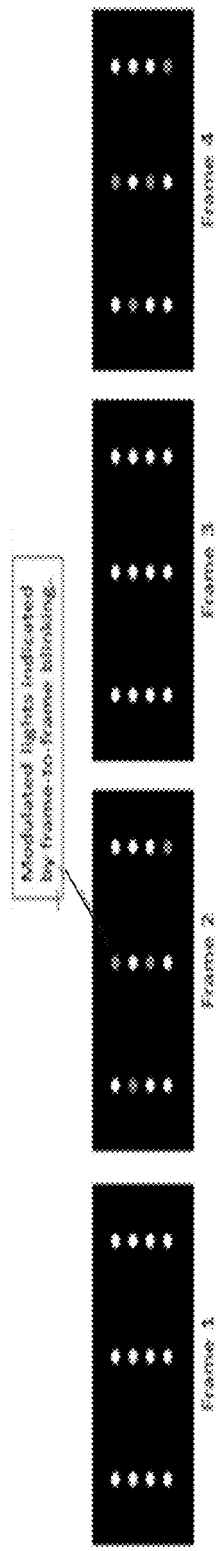

FIGS. 4A-B illustrates an example of modulated lights indicated by frame-to-frame blinking such as may be representative of various embodiments. The ability to identify modulated lights in an image is crucial to the deployment of camera technology that may leverage region-of-interest sub-sampling for demodulating modulated lights because it may be only after the ROI has been determined that sub-sampling may begin.

The techniques described herein may enable a full-frame camera to record a short video of a scene and then ascertain which lights are modulated by observing which lights appear to be blinking. ROI sub-sampling may then be performed on the blinking lights.

The apparent blinking, as seen by the camera, may either be due to a blinking frequency that is slower than the camera frame rate, or it may be due to sub-sampling aliasing produced by the camera of a light that blinks faster than the human flicker perception frequency.

The composite waveform, as described above, includes two parts. In some embodiments the first part may include a lower frequency time varying amplitude component that, when subsampled by a low frame rate camera, results in alias induced flicker (i.e. blinking, twinkle). In various embodiments, the flicker may be useful for quickly identifying which light sources are modulated with data. In some embodiments, the second part may include a high data rate portion using VPPM that may vary the duty cycle of the pulses to generate the lower frequency time varying amplitude component while simultaneously sending high rate data via PPM. This high rate VPPM waveform may be Nyquist sampled by a high frame rate camera, using ROI subsampling, to extract the high rate data. This higher rate VPPM data transmission from a light source, such as an LED, may be asynchronous with respect to the receiving camera; that is, the data rate timing clocks may be close in frequency, but they are not frequency synchronous.

The beginning of a data packet may be distinguished by a start frame delimiter (SFD), which may be used to establish quasi-stationary timing for the duration of the relatively short data packet. As described herein, the SFD may satisfy the demands of the composite waveform by initiating the proper decoding of the higher rate VPPM data packets while supporting the lower frequency amplitude envelope twinkle.

Figure 5:
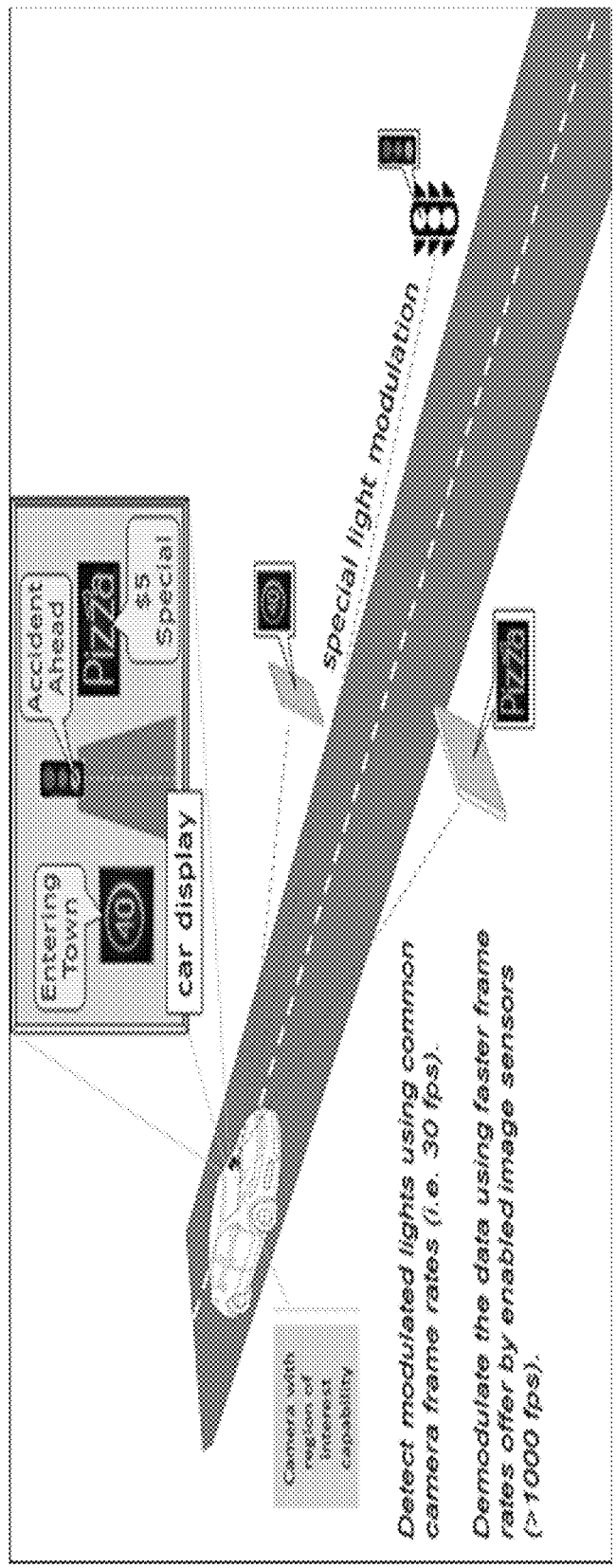
FIG. 5 illustrates an exemplary embodiment of an optical wireless communication system.

FIG. 5 illustrates an exemplary embodiment of an optical wireless communication system. A camera may be mounted on a vehicle so as to view down the road. Along the side of the road there may be LED signage with each sign being modulated with a special waveform, called a "composite waveform", which may simultaneously sends data and a frequency tone. The frequency tone is used to indicate to the camera which LED signage in the field of view is modulated with data. The camera needs to know which LED signs are transmitting data because the camera will sequentially scan each LED sign, using a reduced pixel count "region of interest" mode, to extract the data message at a high frame rate scan.

Figure 6:
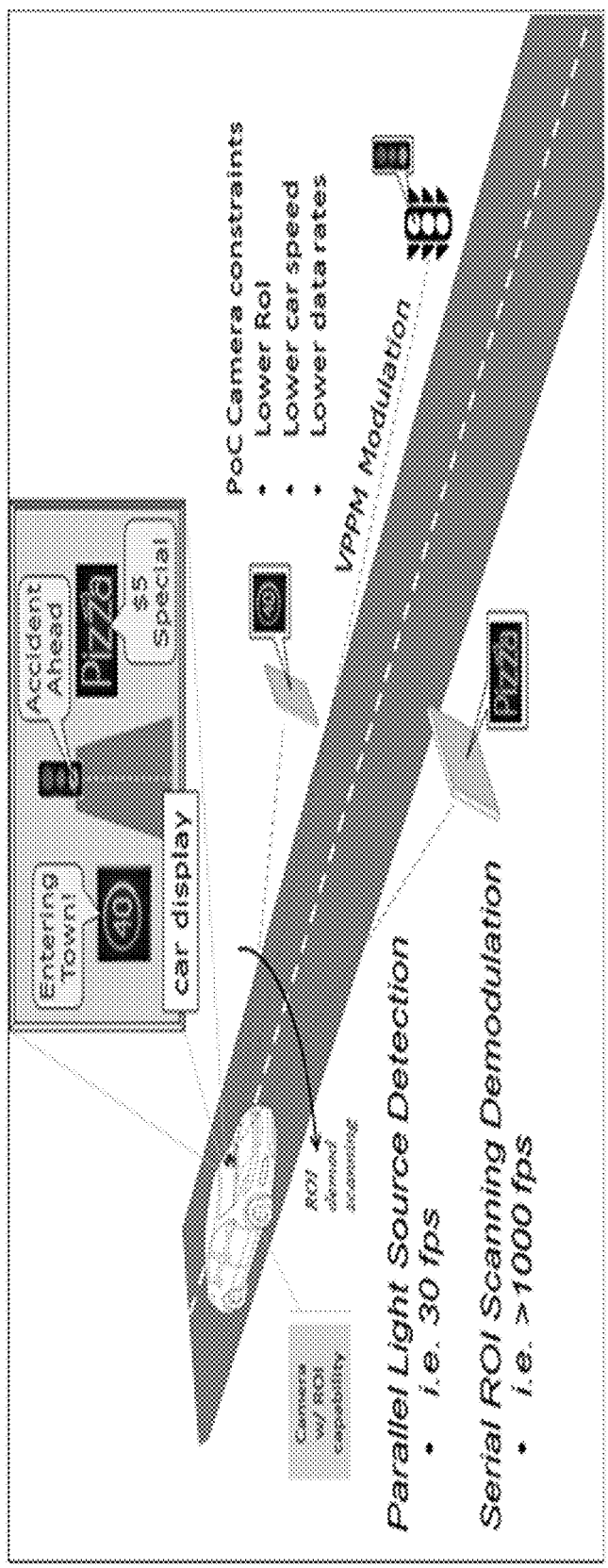
FIG. 6 illustrates an exemplary scanning process utilized by an optical wireless communication system.

FIG. 6 provides more detail on the scanning process. The detail shows that in some embodiments the car's camera is initially viewing the scene at a frame rate of 30 fps to identify which LED signs are modulated with data, and then scans each sign at a much higher frame rate (e.g. 10 kfps) over a reduce pixel region-of-interest image area.

Figure 7:
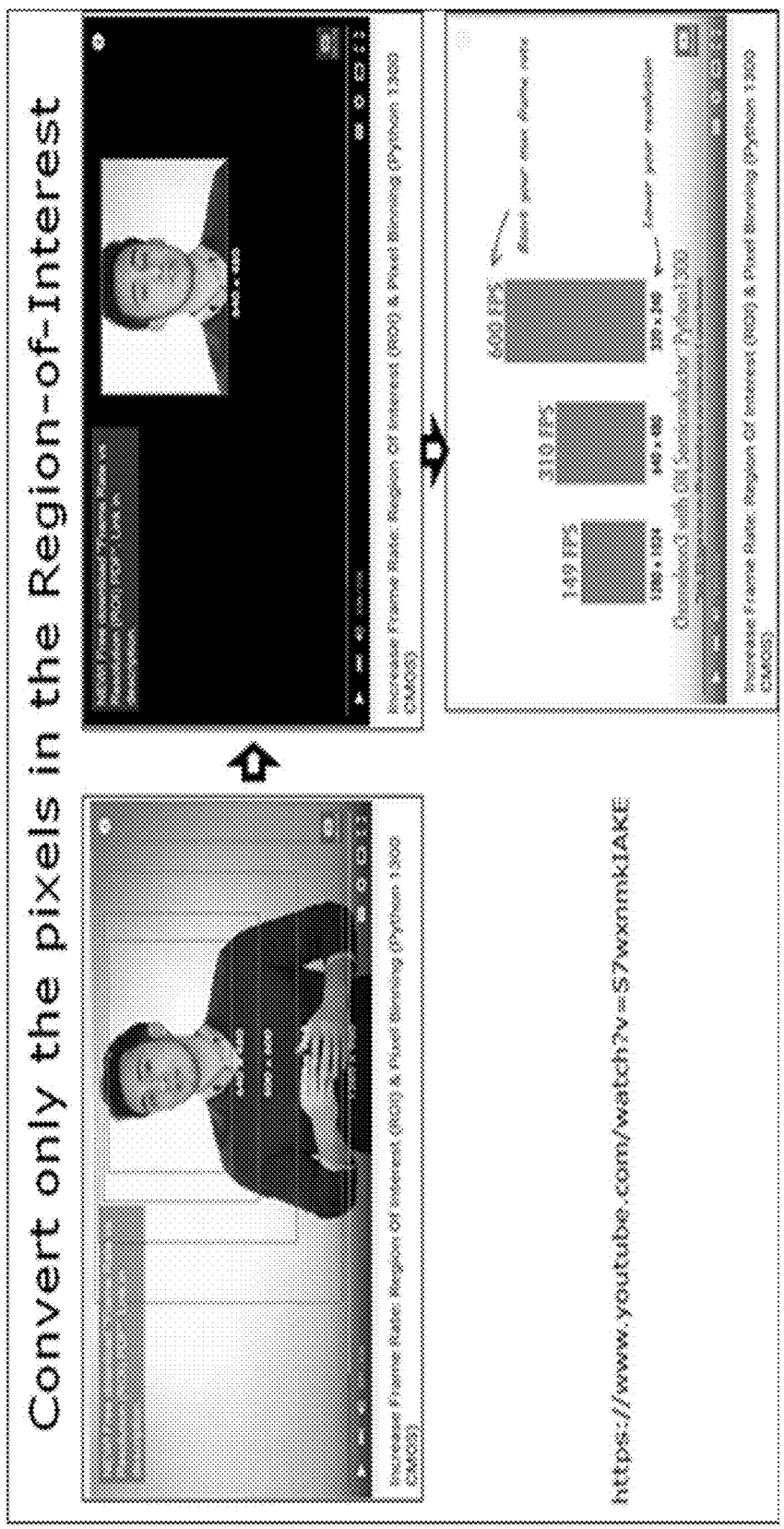
FIG. 7 illustrates an exemplary embodiment of ROI scanning.

FIG. 7 demonstrates an exemplary embodiment of ROI scanning. The image in the left portion of FIG. 7 shows an embodiment of the full pixel image. The image in the right portion of FIG. 7 shows a reduced pixel count "region-of-interest" image. As the image conversion time may be proportional to the number of pixels, the reduced image on the right takes less time to convert than the image on the left; thus, the frame rate can be significantly higher, thereby improving performance of the system.

Figure 8:
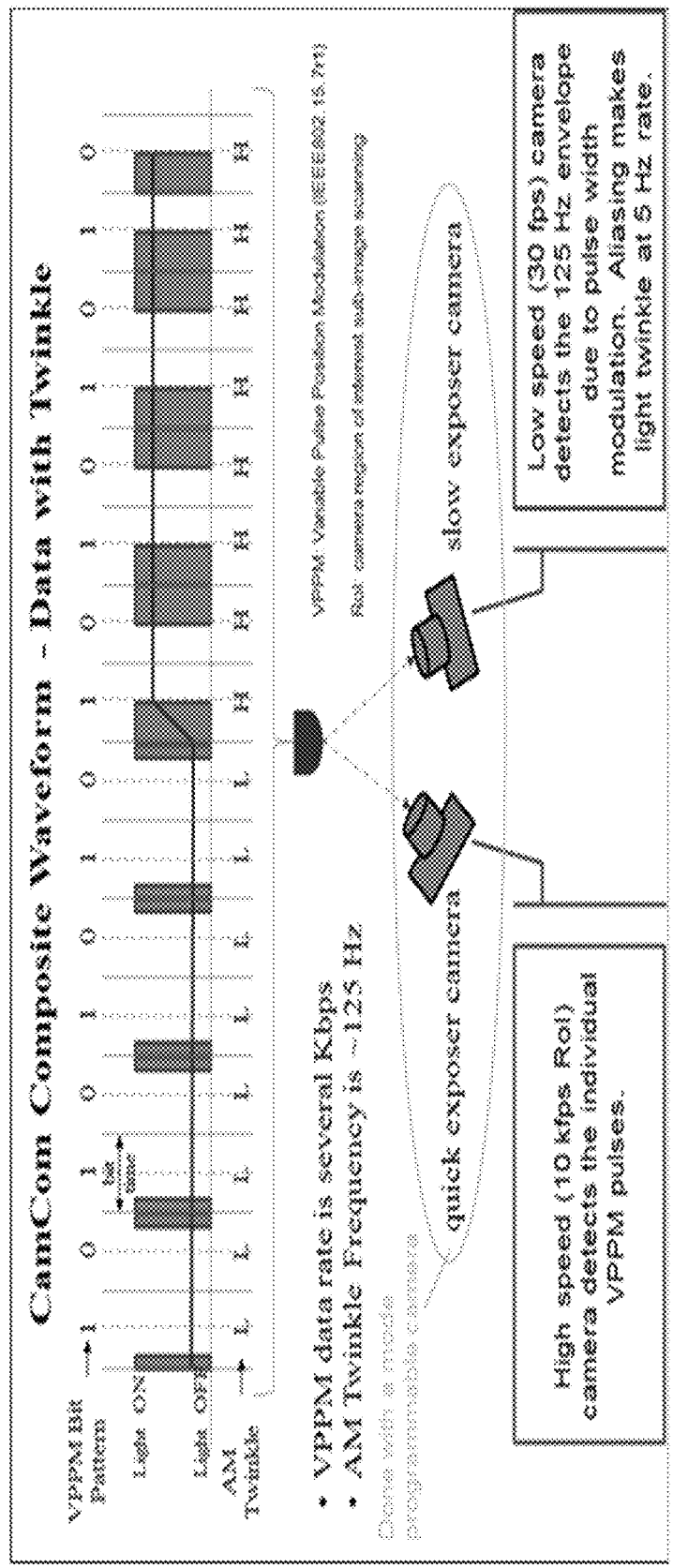
FIG. 8 illustrates an exemplary embodiment of a composite waveform that may be utilized by the optical wireless communication system of FIG. 5.

FIG. 8 illustrates an exemplary embodiment of a composite waveform that may be utilized by the optical wireless communication system of FIG. 5. The composite waveform may include two parts: (i) a VPPM component which may transmit higher rate data bits, and (ii) a lower frequency component which may be generated by time varying the duty cycle of the PPM pulses. The lower frequency induced waveform may be used to indicate an LED sign is modulated with data. In some embodiments both parts are detected by adjusting the exposure settings of a single camera. In other embodiments, each part is detected by a separate camera.

Figure 9:
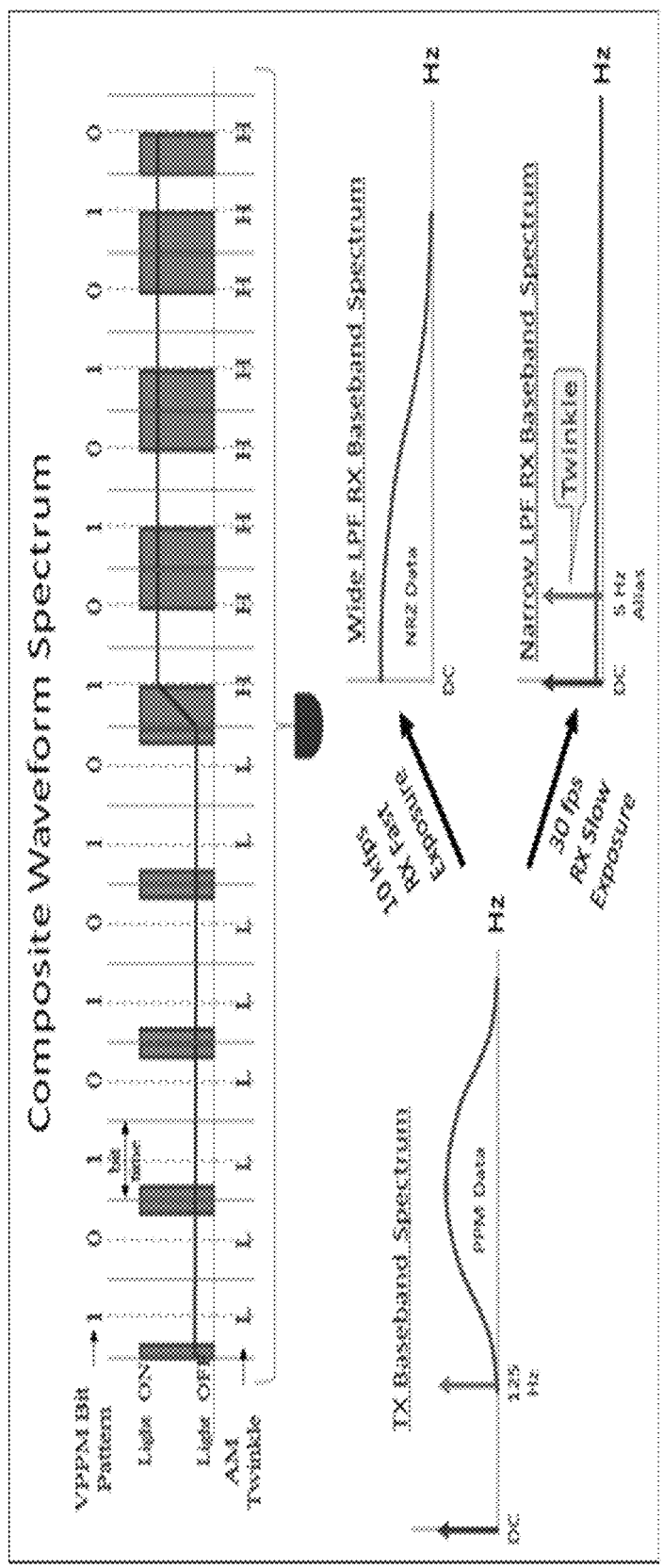
FIG. 9 illustrates a spectrum of the composite waveform to further illustrate the duality of the signals.
Figure 10:
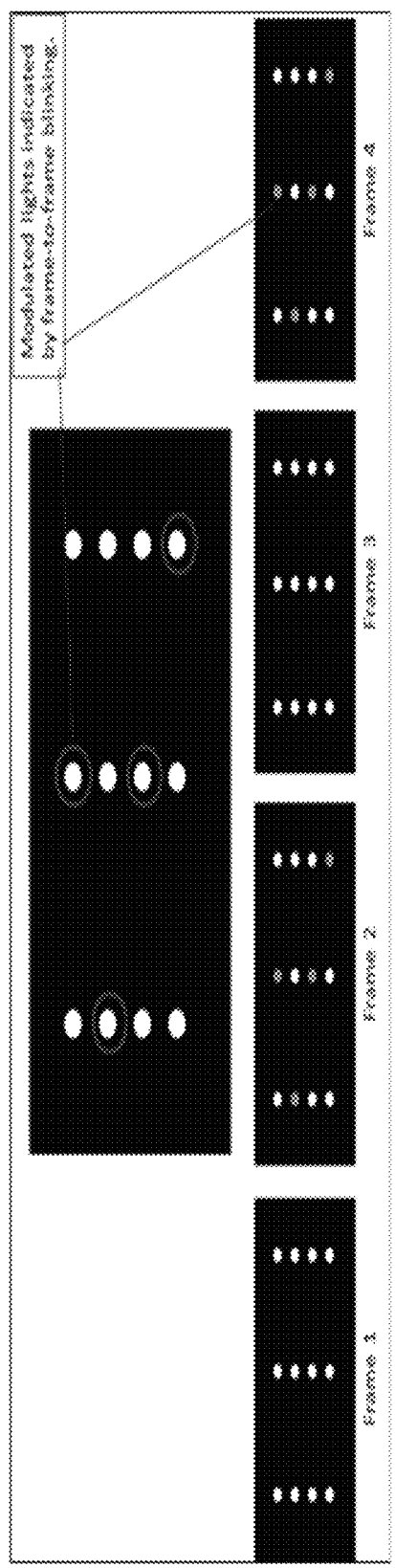
FIG. 10 illustrates modulated lights indicated by frame-to-frame blinking.

FIG. 9 illustrates a spectrum of the composite waveform to further illustrate the duality of the signals. The lower right corner of FIG. 9 shows the spectral aliasing that may be associated with under sampling the exemplary 125 Hz tone with an exemplary 30 fps camera. In some embodiments this may be accomplished with under sample frequency shift ON OFF keying, as described in detail below. The end result is the fact that this exemplary 125 Hz tone translates to a lower exemplary frequency of 5 Hz signal when sampled at 30 fps. The 5 Hz alias tone may manifests itself as 5 Hz ON-OFF keying which makes the LED light source of interest appear to twinkle. This is shown in FIG. 10 when captured as frames from a short video.

Figure 11:
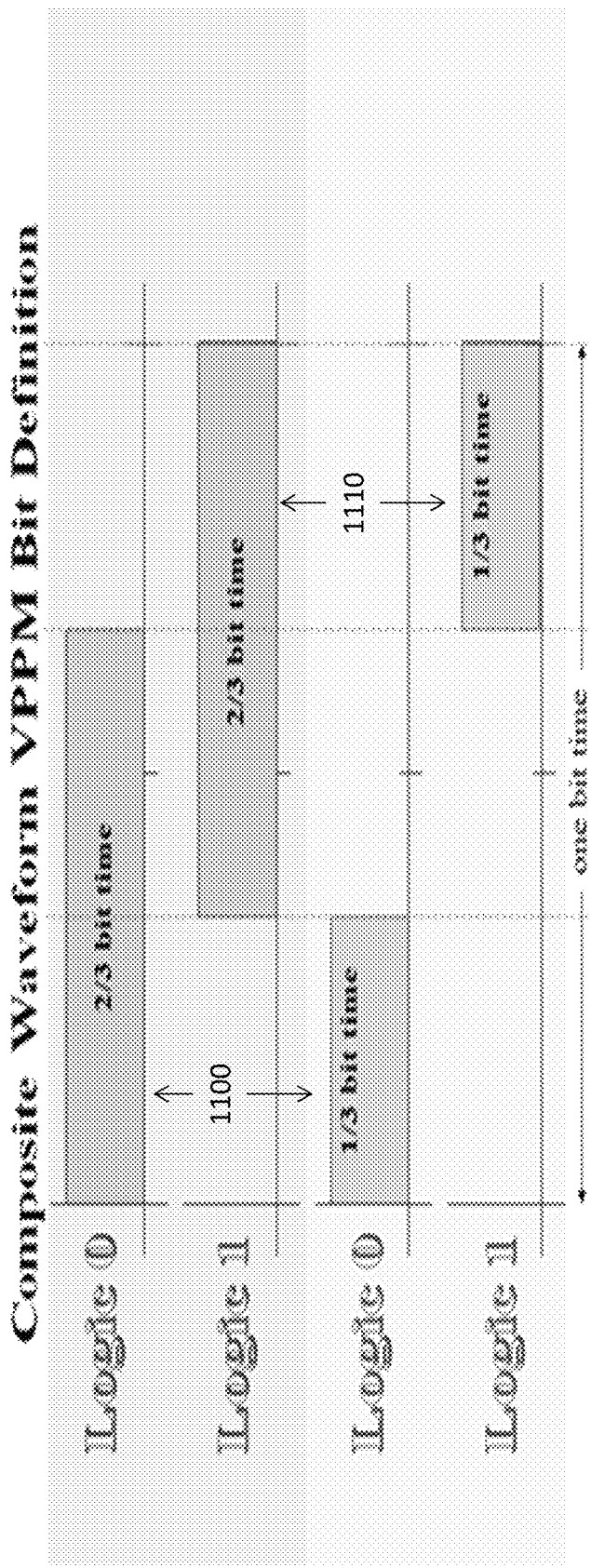
FIG. 11 illustrates an example of VPPM bit definitions.

FIG. 11 illustrates an exemplary VPPM bit definitions that may generate the amplitude modulation. Notice that logic "0" and "1" can come in two versions: ⅔ and ⅓ duty cycle. One difference is the position of the pulse within the bit period and the width of the pulse. Again, the position of the pulse within the bit period may differentiate between a logic "0" and a logic "1". In some embodiments, this choice of pulse widths may allow the generation of the AM envelope while using a minimum transmitter bit rate clock oversample rate of 3. Referring to FIG. 11, there are four waveforms represented in the time duration of one bit (i.e., one bit time). If the pulse is on the left side of the bit time (1100) then a logic 0 is being sent. If the pulse is on the right side of the bit time (1110) then a logic 1 is being sent. The pulse width is either ⅔ of a bit time or ⅓ of a bit time depending upon the need to generate the AM envelope signal The pulses shown in FIG. 11 can intensity modulate an LED light by turning on and off the light. The pulsating light may be observed by a camera operating at a video frame rate that provides 4 video frames per PPM bit period (i.e., camera frame rate is four times the VPPM bit rate). Thus, FIG. 11 shows logics 0 and 1 for each of the ⅔ bit time (interchangeably, bit period) and for ⅓ bit time period.

Figure 12:
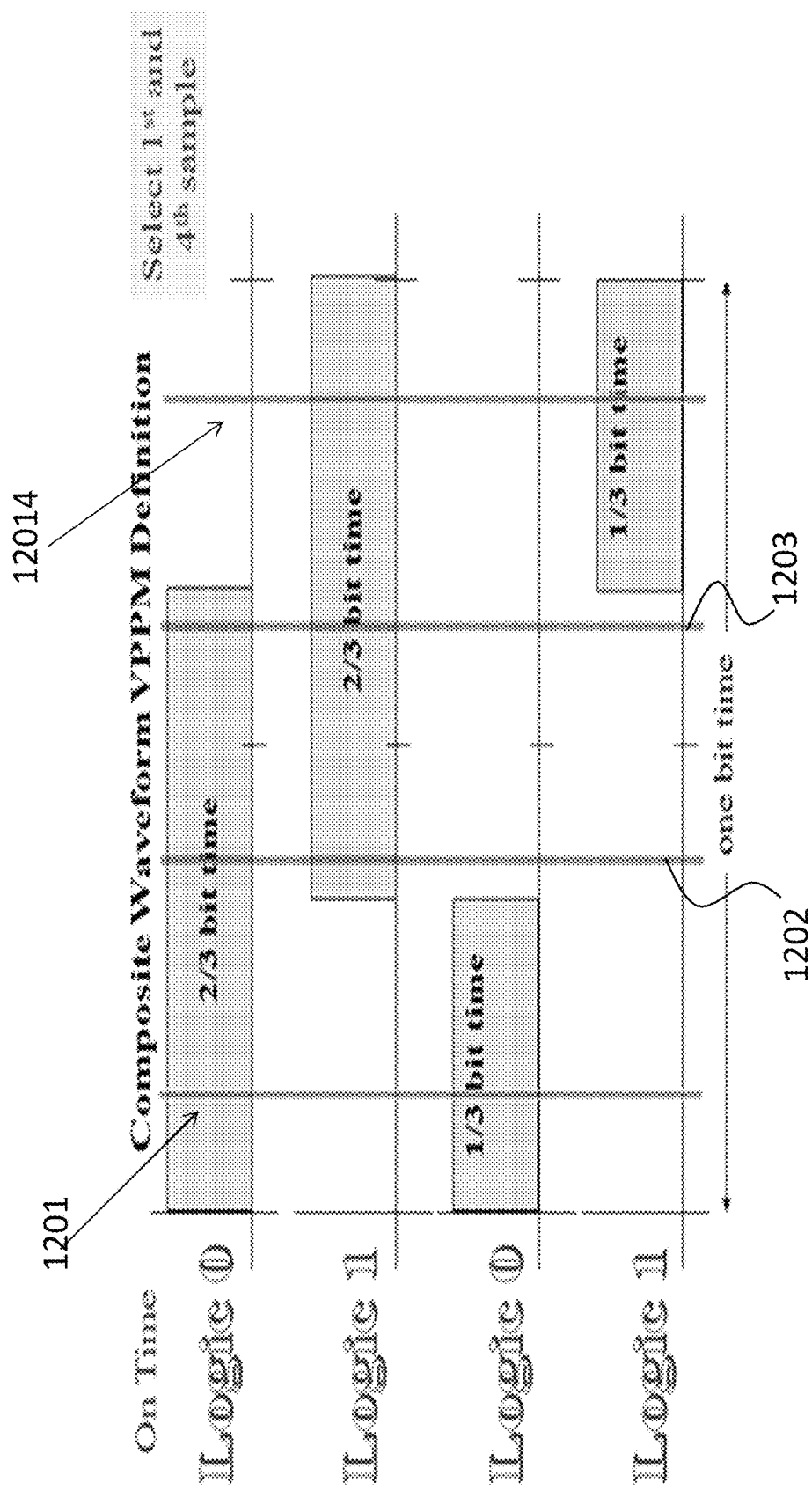
FIGS. 12-15 illustrate exemplary VPPM pulse patterns.

FIG. 12 illustrates one possible sample phase of the camera as it records the state of the PPM modulated LED light. Here, the first 1201 and the fourth 1204 data samplings are selected to represent transmitted optical data. FIG. 12 demonstrates that for the four shown camera sample times, only the first 1201 and fourth 1204 samples will allow correct decoding of the PPM data in this embodiments. The proper signal processing for this particular camera sample phase would be to keep the first 1201 and fourth 1204 sample and discard the second 1202 and third 1203 samples; however, this rule only applies to the particular application of FIG. 12.

Figure 13:
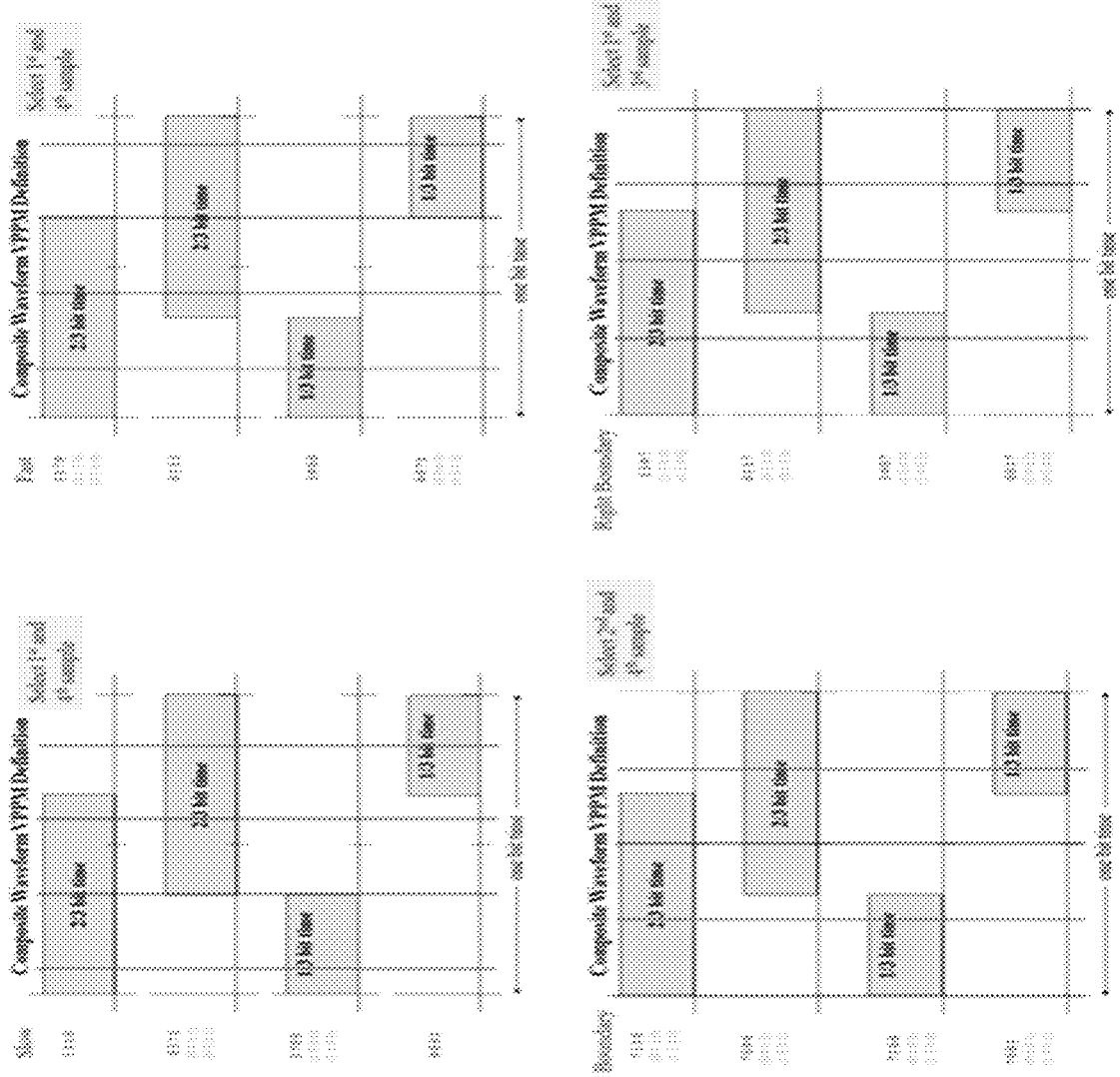

FIG. 13 illustrates some alternative camera sample phases. Specifically, FIG. 13 shows the same set of VPPM pulse patterns as FIG. 12 but with four different camera sample phases. These phases are 'slow', 'fast', 'left boundary' and 'right boundary'. Notice that the top two camera sample phases would also select the first and fourth samples for PPM bit decoding, but the bottom two camera sample phases would select the second and fourth and the first and third sample phases respectively.

In certain disclosed embodiments, the PPM signal processing circuitry determines which sample phases to keep and which sample phases to discard. This may be accomplished with the information provided by the start frame delimiter (SFD) which is described in reference to FIG. 16.

Figure 14:
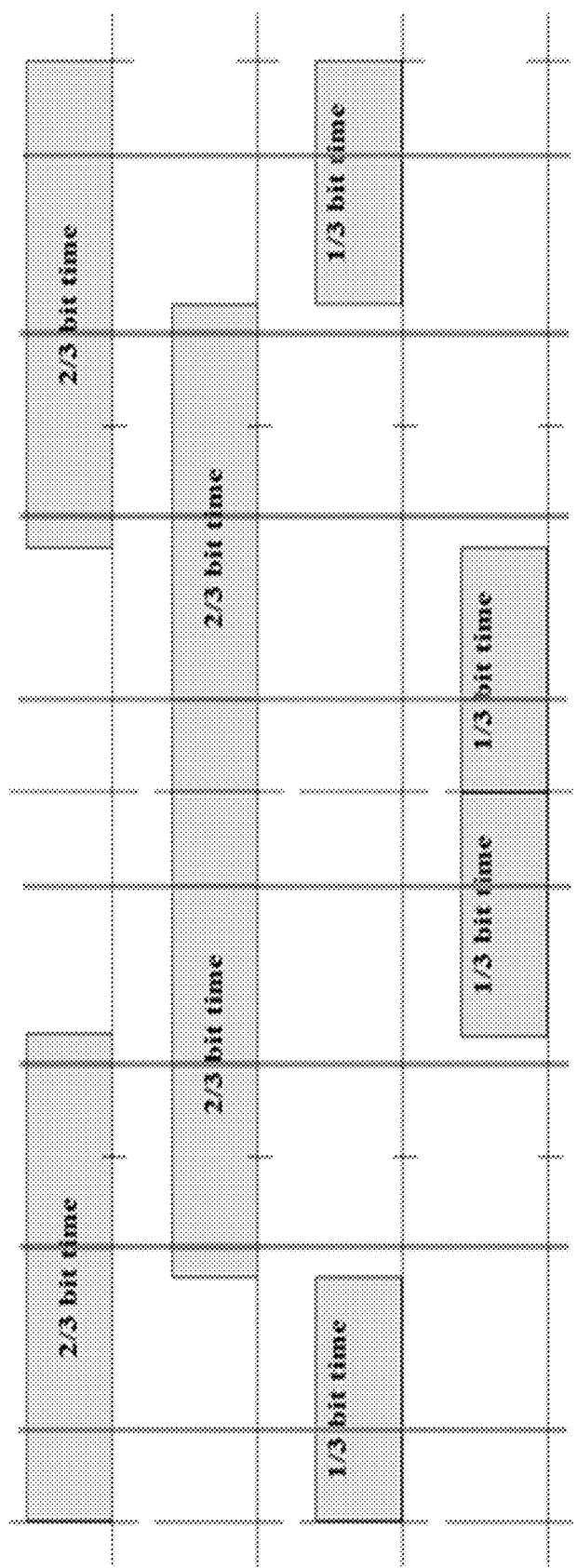
Figure 15:
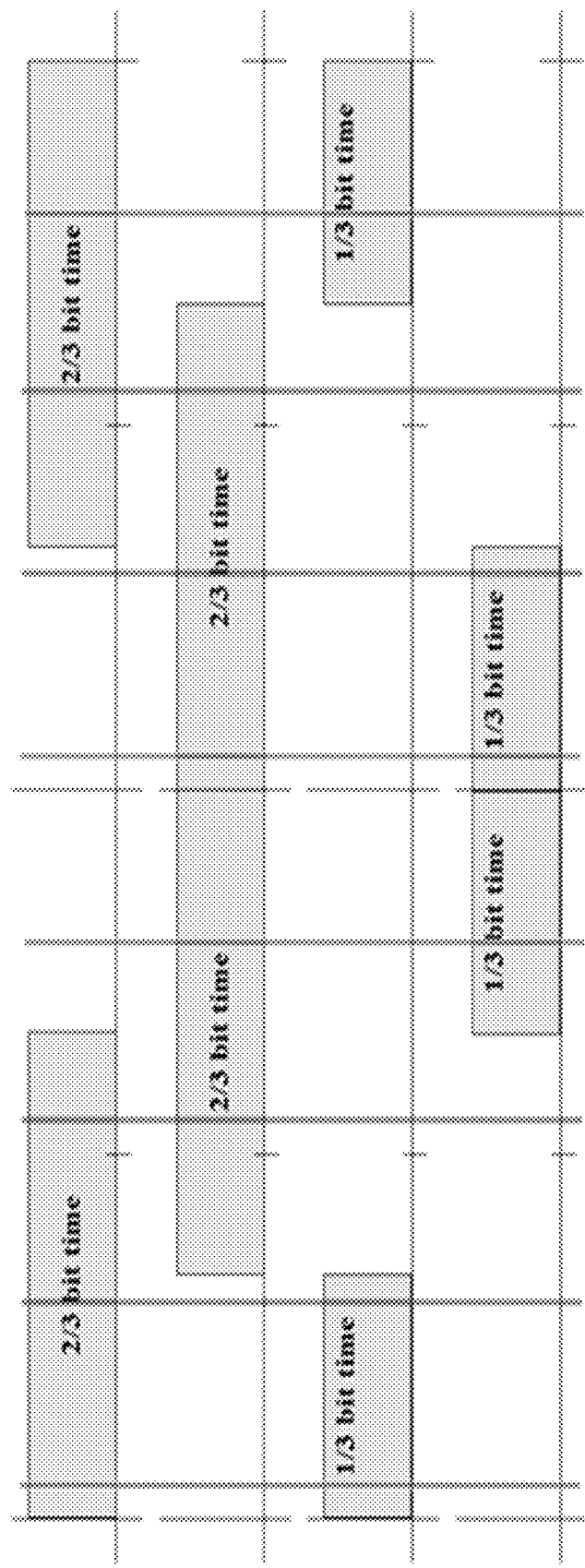

The following is a description of the maximum run length for a normal VPPM symbol according to one embodiment of the disclosure. FIG. 14 shows possible sampled VPPM pulse sequences for bit patterns '01' and '10' according to various disclosed embodiments. It is evident that the consecutive sample run length without a level transition is six (either six 6 ones in a row or 6 zeros in a row). FIG. 15 shows that for an extreme sample phase, the run length reduces to 5 but it never exceeds 6 consecutive sample values without a level transition.

Figure 16:
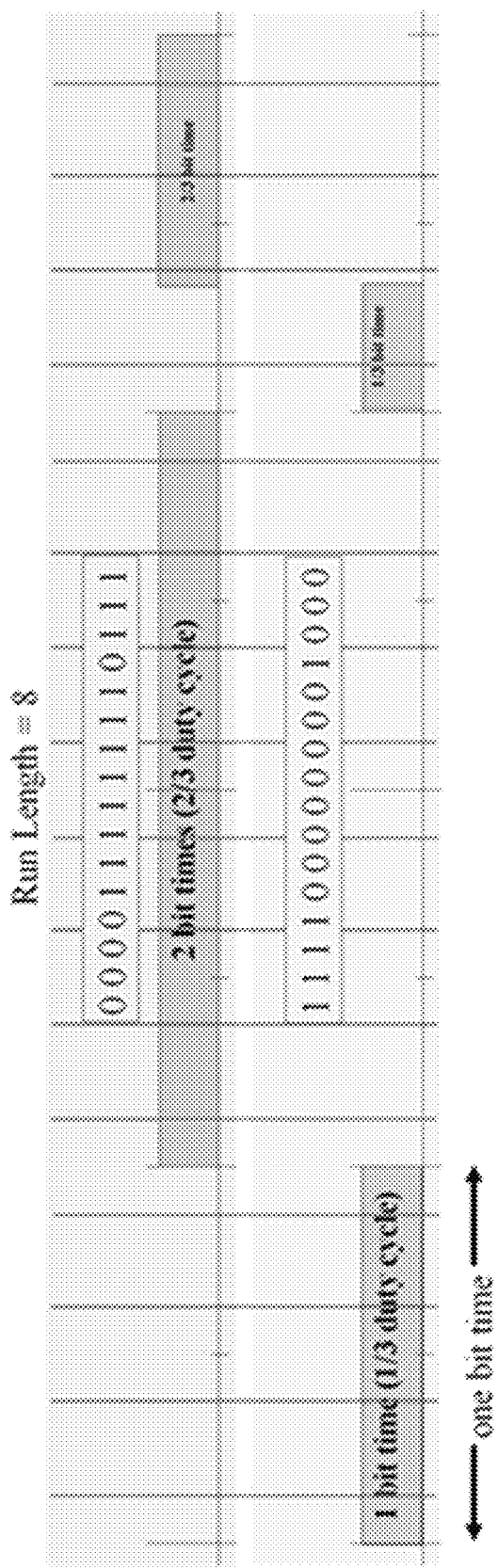
FIG. 16 illustrates an exemplary SFD definition.

FIG. 16 illustrates an exemplary embodiment of the SFD according to various embodiments. As shown in FIG. 16, the SFD can be 4 bit periods long and may support both ⅔ and ⅓ duty cycle. In one embodiment, the SFD may include two parts: a three bit period long 'illegal character' start flag followed by a 'logic symbol' (i.e., logic one for the ⅔ duty cycle and logic zero for the ⅓ duty cycle). The first part of the SFD, the start flag, may be called an 'illegal character' because, as previously shown for VPPM, there would never be a run length of 8 for a legal character set. Accordingly, when a run length of 8 is observed then it can be determined that the start flag is 'coming through'. In an exemplary implementation, the last bit period in the SFD, the logic symbol, may be used to determine the down-sampling phase; that is, which samples to keep and which sample to discard.

Figure 17:
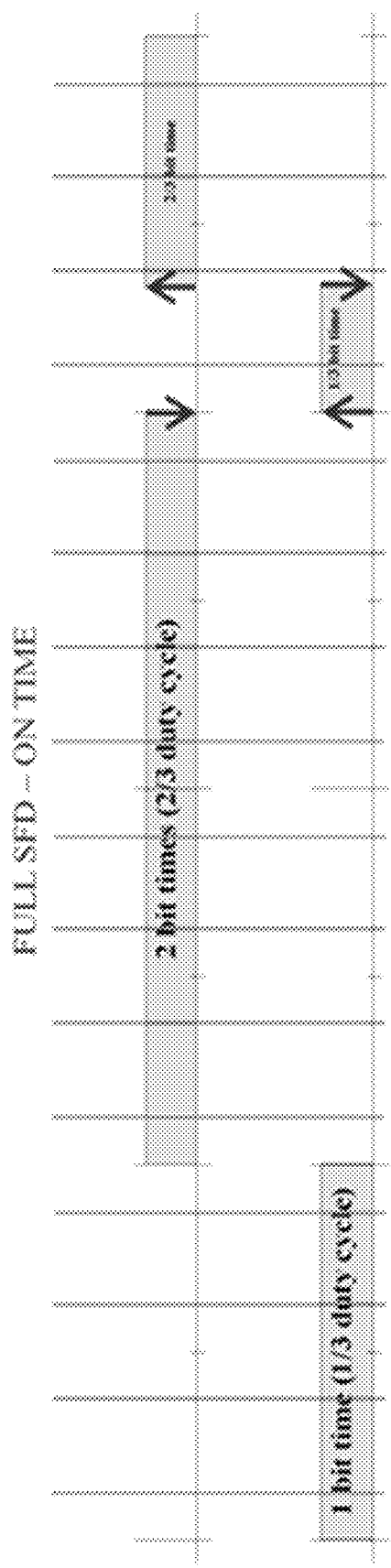
FIG. 17 illustrates an example of forced SFD transitions.

FIG. 17 illustrates an example of forced logic level transitions with respect to the SFD. These logic transitions, which occur on bit boundaries, may be used to measure the inter-symbol-interference (ISI). In some embodiments, ISI defines how quickly the light—as seen by the camera—transitions from one logic level to the other. This may be required in order to determine which of the four sample phases to select when decoding the pulse position modulation into bits.

Figure 18:
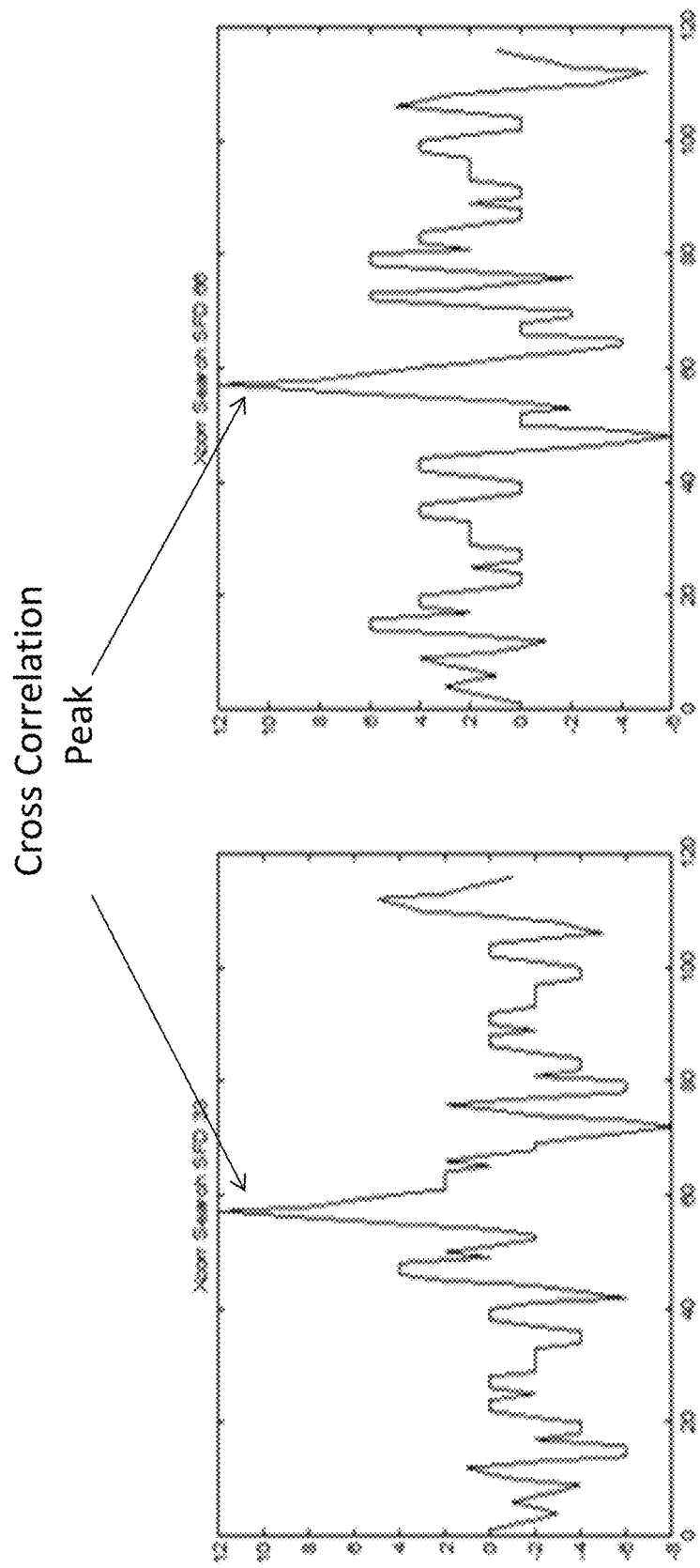
FIG. 18 illustrates an example of the cross-correlation performance with the SFD mask embedded in a random data sequence.

FIG. 18 illustrates an example of the cross-correlation performance with the SFD mask embedded in a random data sequence. The cross-correlation peak is clearly observable in the illustrated embodiment. As will be appreciated by one of skill in the art, the peak can be extracted by several different methods, of which one technique will be presented later on in FIG. 25.

Figure 19:
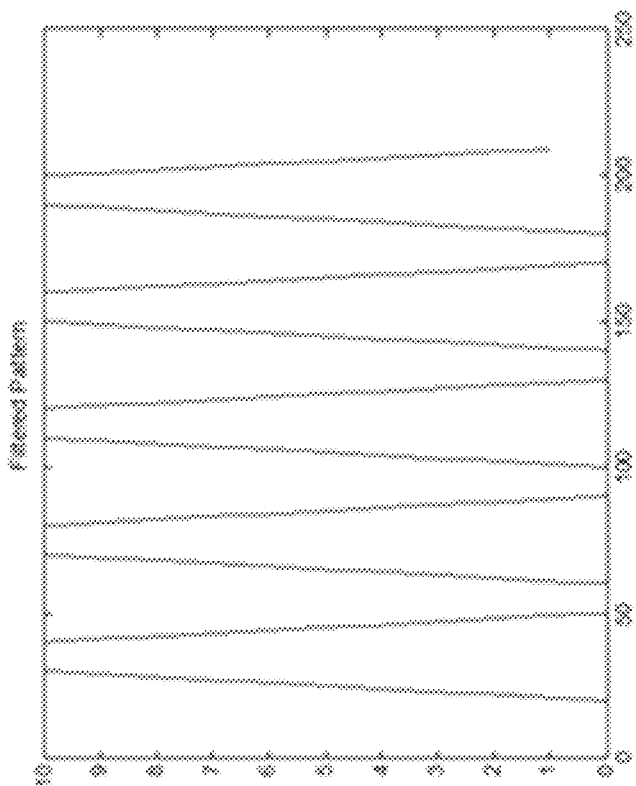
FIG. 19 illustrates an embodiment of camera induced intersymbol interference.
Figure 19:
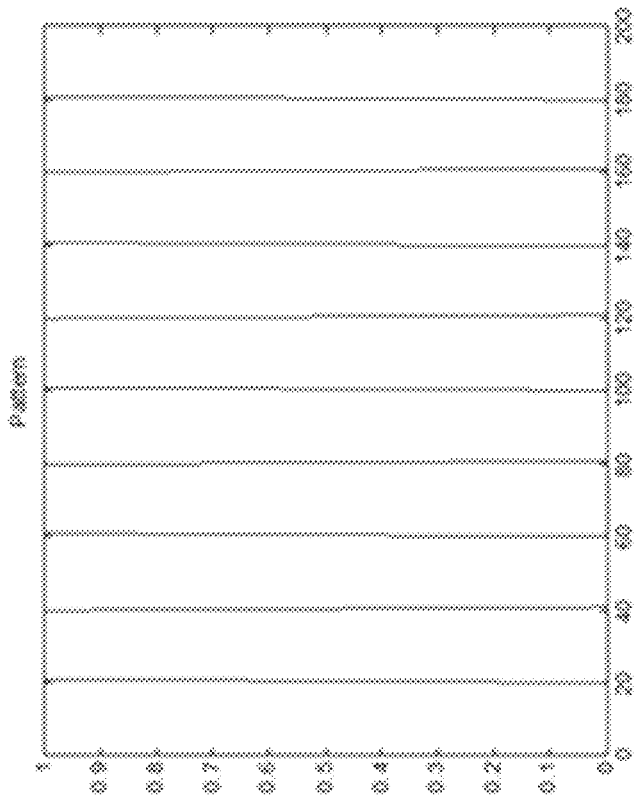

Camera integration time induced ISI will now be described in more detail. Cameras include a pixel integration time, perhaps more commonly called the exposure time, which may be the time duration that the pixel is exposed to the light source. When the camera exposure time overlaps a logic level transition then the result is ISI. This makes the 'bit pattern' have sloped edges instead of sharp transitions as shown in FIG. 19. In FIG. 19 the camera exposure is ¼ of a bit time. Avoiding the use of camera samples that occur near transition edges can reduce or eliminate this ISI as discussed below. In some embodiments, with four samples per bit, down-sample phases that are not near symbol boundaries may be selected.

Figure 20:
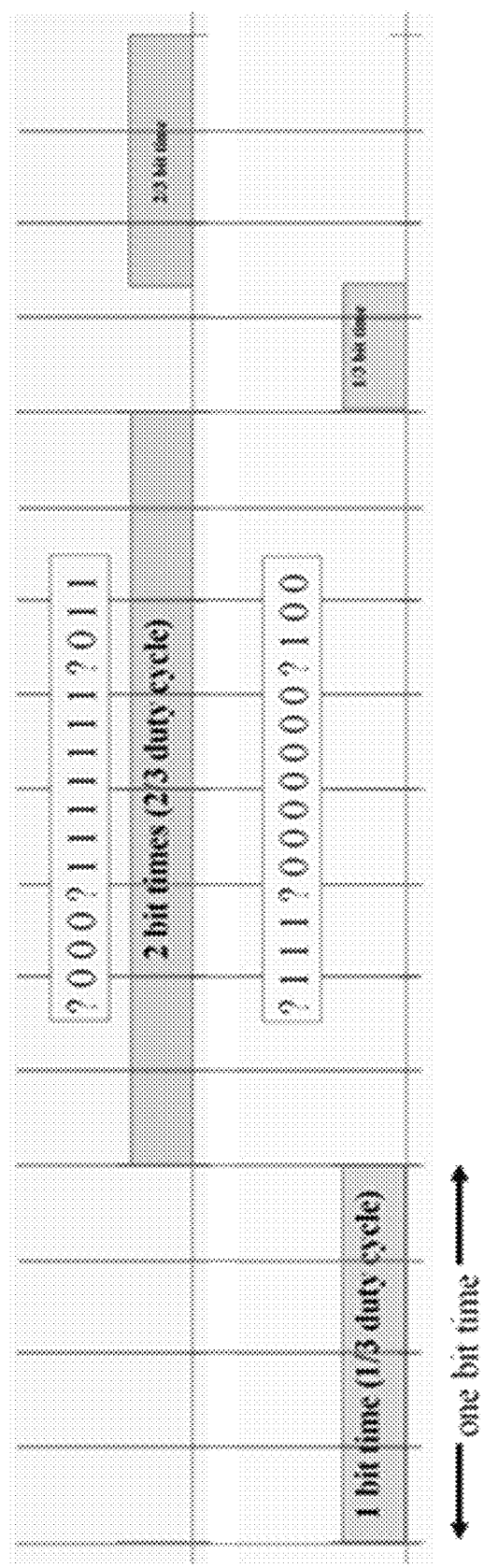
FIG. 20 illustrates an exemplary sample phases.
Figure 21:
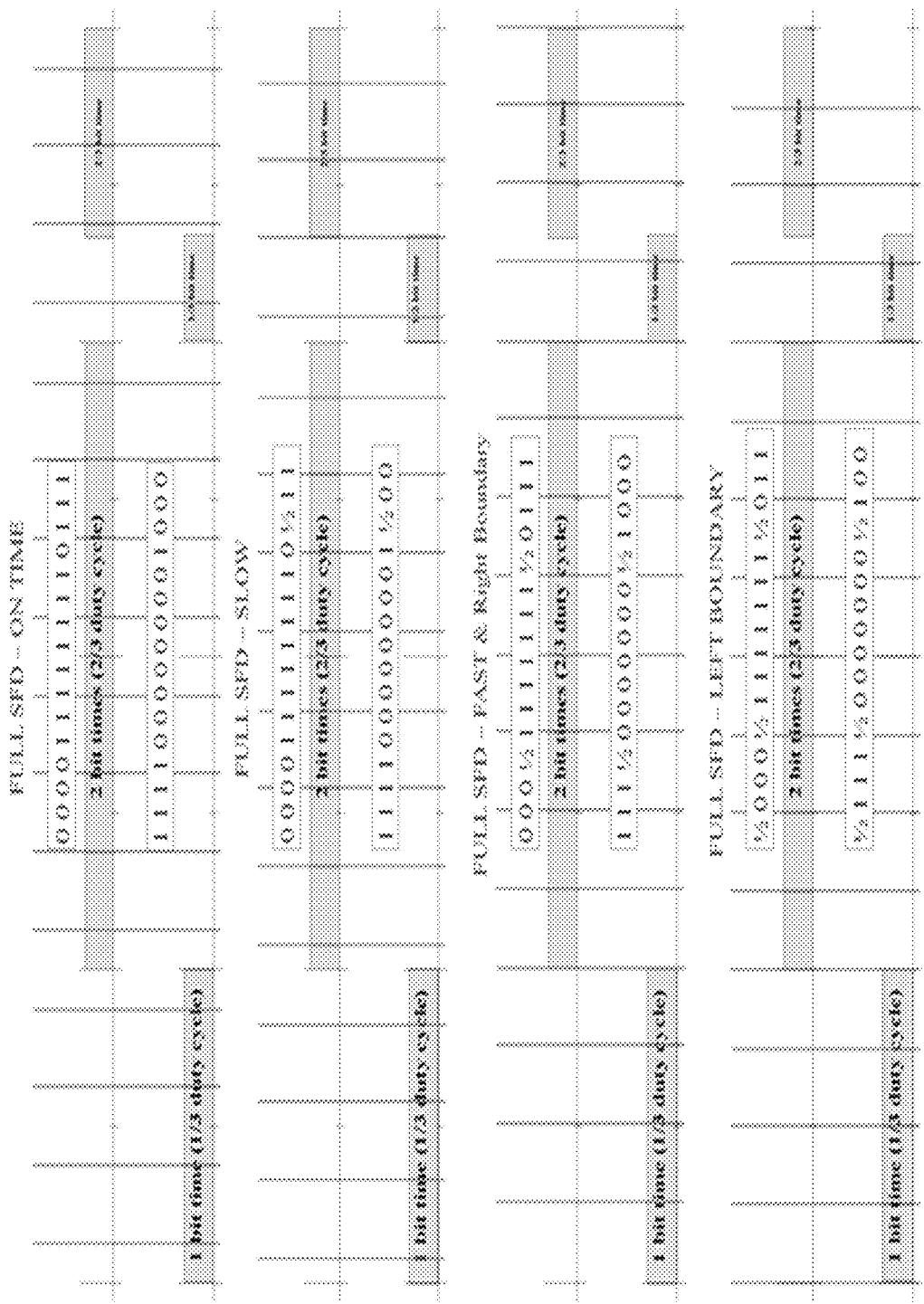
FIG. 21 illustrates other exemplary sample phases.

FIG. 20 shows that even for an extreme exemplary sample phase the run length may never be less than seven (7). In the illustrated embodiment, where indeterminate samples that fall on boundaries are shown as question marks. Referring to FIG. 20, it can be seen that a case where the camera sampled the SFD on a transition boundary resulting in an ambiguous sample value that is somewhere between a high value and a low value due to ISI. But even for the contrived case of FIG. 20, the run length is not less than 7 and could be as large as 9. FIG. 21 illustrates some possible sample phases and the resulting bit patterns from which the down-sampling decision rules may be determined according to different embodiments of the disclosure.

Figure 22:
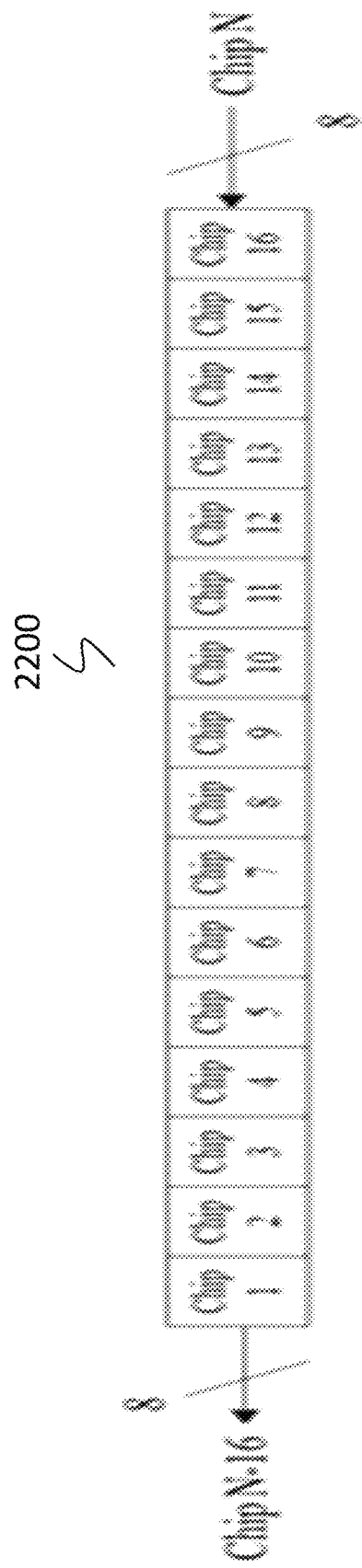
FIG. 22 illustrates an exemplary shift register.

In another embodiment, the disclosure relates to an SFD acquisition algorithm. To explain the acquisition process we utilize an exemplary length 16 shift register in which each new sample enters on the right and the oldest sample exits on the left as shown in FIG. 22. The data flowing into the shift register 2200 typically includes 8 bit gray scale analog-to-digital outputs extracted from the pixel of interest, which is the pixel that is being illuminated by the light of interest. The following example will illustrate five steps of the exemplary SFD acquisition algorithm.

Figure 23:
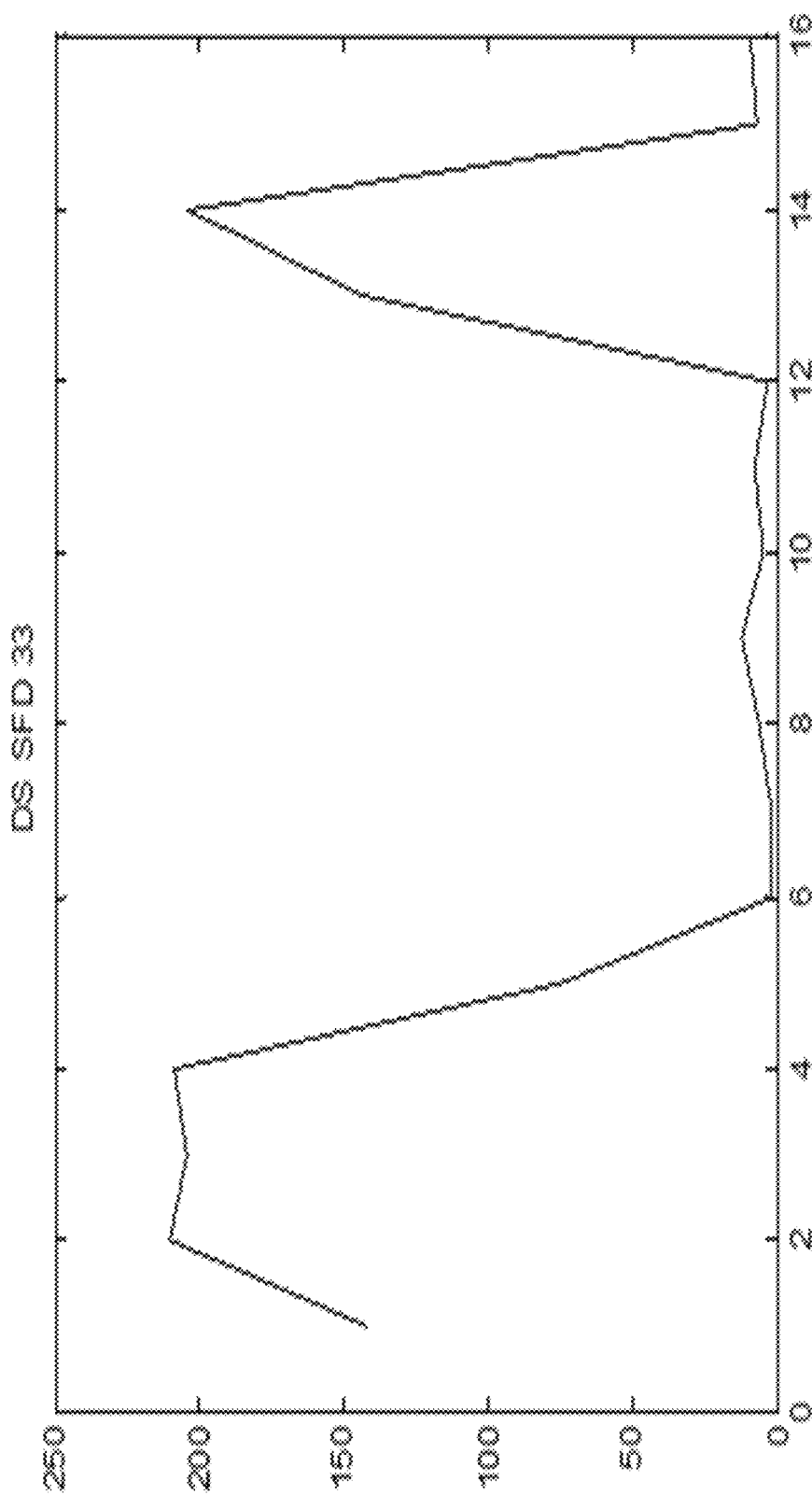
FIG. 23 illustrates an embodiment of shift register raw ADC samples.

1. The data in the shift register will consist of 8 bit samples taken when the light is either ON or when the light is OFF as shown in FIG. 23. It is also possible that the shift register will contain data samples taken when the light was in transition and those 8 bit values will be somewhere in between.

Figure 24:
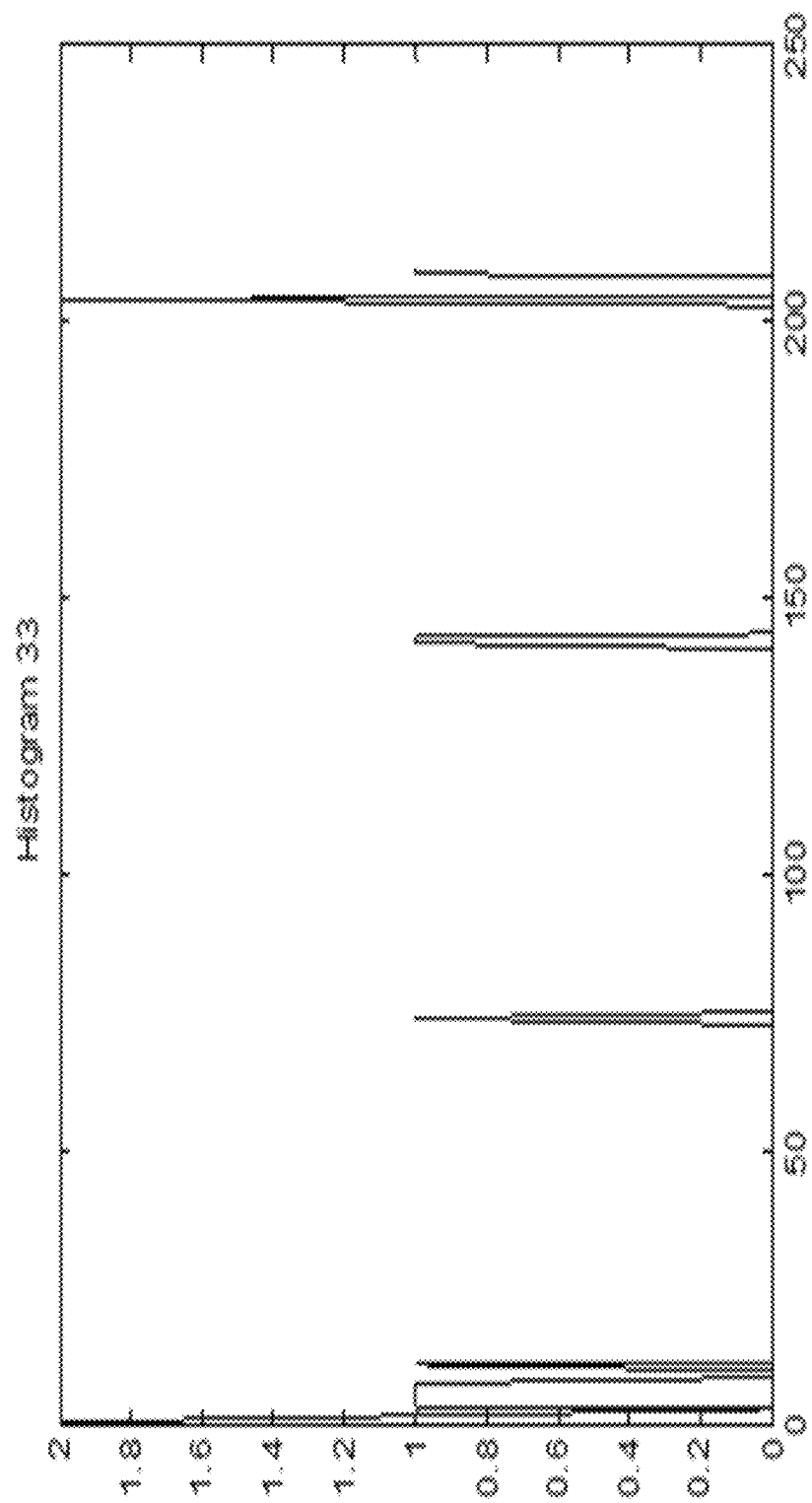
FIG. 24 illustrates an example histogram for a ⅓ duty cycle SFD.

We first generate a histogram to ascertain what 8 bit word constitutes the light being ON and what 8 bit word constitutes the light being OFF. FIG. 24 shows an example histogram for a ⅓ duty cycle SFD. We can see from FIG. 24 that, for this example, a light OFF condition has a value less than decimal 12 and a light ON condition has a value greater than decimal 203. We also see we have two transition values near decimal 74 and decimal 142. It would be reasonable to set a decision threshold of decimal 108 for deciding what constitutes a logic ZERO (less than 108) and what constitutes a logic ONE (greater than 108).

Figure 25:
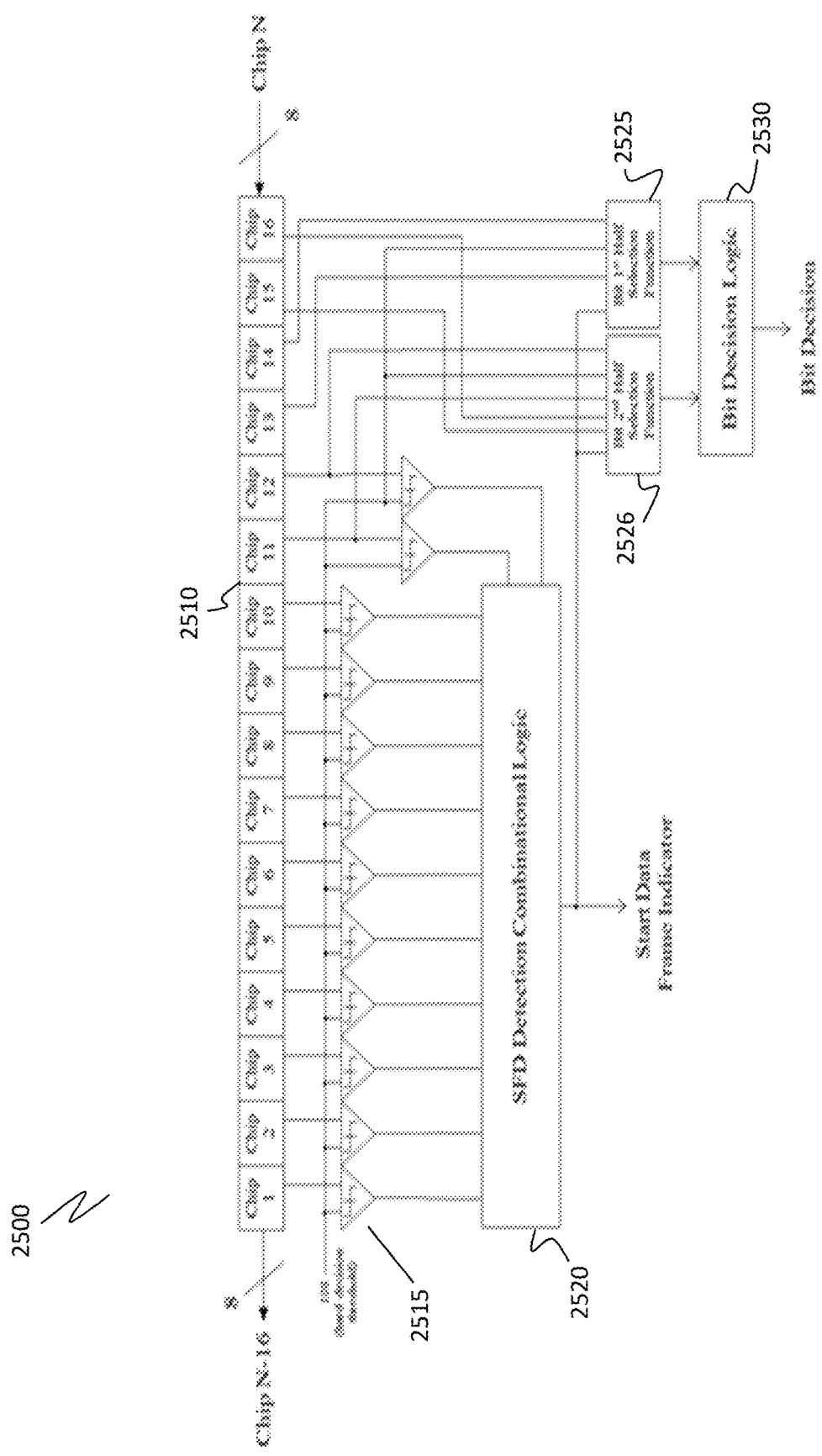
FIG. 25 illustrates an exemplary implementation based upon "hard decision" processing.

2. The next step is to monitor the contents of the shift register looking for the occurrence of a valid SFD. FIG. 25 shows a viable implementation based upon 'hard decision' processing. The system 2500 of FIG. 25 includes a shift register having 16 chip storage cells 2510 configured to receive and store one byte of data per clock cycle (not shown), each byte of data representing optical detection at a pixel of interest. In one embodiment, the shift register stores 8 bits of data per clock.

3. The output of the first 12 eight byte storage words (i.e., chips 1-12) in the shift register are compared at comparators 2515 to a threshold (e.g., decimal 108 in this case) and a hard decision ("0" or "1") is made for each of the 12 bits. The hard decisions are then fed into the SFD Detector block (SFD Detection Combinational Logic) 2520 where the Boolean expression for the SFD detector is solved as shown below. In the Boolean expression below, Ci is the hard decision resulting from the $i^{th}$ chip.

$SFD_{DET} =$ $= \overline{(C1\ \&\&\ \overline{C2}\ \&\&\ \overline{C3}\ \&\&\ \overline{C4}\ \&\&\ C5\ \&\&\ C6\ \&\&}$ $\qquad C7\ \&\&\ C8\ \&\&\ C9\ \&\&\ C10\ \&\&\ C11\ \&\&\ C12)\|$ $(C1\ \&\&\ C2\ \&\&\ C3\ \&\&\ C4\ \&\&\ \overline{C5}\ \&\&\ \overline{C6}\ \&\&\ \overline{C7}\ \&\&$ $\qquad \overline{C8}\ \&\&\ \overline{C9}\ \&\&\ \overline{C10}\ \&\&\ \overline{C11}\ \&\&\ \overline{C12})$ 4. The $SFD_{DET}$ signal is used to gate the outputs for the two blocks called Bit $1^{st}$ Half Selection Function 2525 and Bit $2^{nd}$ Half Selection Function 2526. In one embodiment, the two blocks operate as shown below. The output of the Bit $1^{st}$ and $2^{nd}$ Selection Function is directed to Bit Decision Logic 2530 to arrive at a Bit Decision.

Bit $1^{st}$ Half Selection Function Output

---

If ((Chip 13 + Chip 14)/2) > Threshold when $SFD_{DET}$ goes HIGH
Then on each subsequent chip clock do the following until $SDF_{DET}$ goes HIGH again
    If (Chip 13 >= Chip 14)
        Output_1 = Chip 13
    Else
        Output_1 = Chip 14
    End
Else on each subsequent chip clock do the following until $SDF_{DET}$ goes HIGH again
    If (Chip 13 <= Chip 14)
        Output_1 = Chip 13
    Else
        Output_1 = Chip 14
    End
End

---

Bit $2^{nd}$ Half Selection Function Output

---

If ((Chip 11 + Chip 12)/2) > Threshold when $SFD_{DET}$ goes HIGH
Then on each subsequent chip clock do the following until $SDF_{DET}$ goes HIGH again
    If (Chip 11 > Chip 12)
        Output_2 = Chip 15
    Else
        Output_2 = Chip 16
    End -continued

```
Else on each subsequent chip clock do the following until SDF_DET goes
HIGH again
    If (Chip 11 < Chip 12)
        Output_2 = Chip 15
    Else
        Output_2 = Chip 16
    End
End
```

5. Next we make bit decisions based upon the outputs of the Bit $1^{st}$ Half Selection Function and Bit $2^{nd}$ Half Selection Function as shown below (i.e., pulse position modulation decoder).

```
If (Output_1 > Output_2)
    Bit_OUT = 0
Else
    Bit_OUT = 1
End
```

6. Finally, whenever there is another indication that an SFD has occurred (i.e., $SFD_{DET}$ goes HIGH), then the last 3 bit decisions are discarded since what was decoded was the SFD occurrence and not bit data.

As may be appreciated, there are many different variations on this implementation theme and what has been shown is just one possible realization. Also, it merits pointing out that the whole purpose of step #4 is to select down-sample phases that will minimize the impact of ISI as previously discussed.

Figure 26:
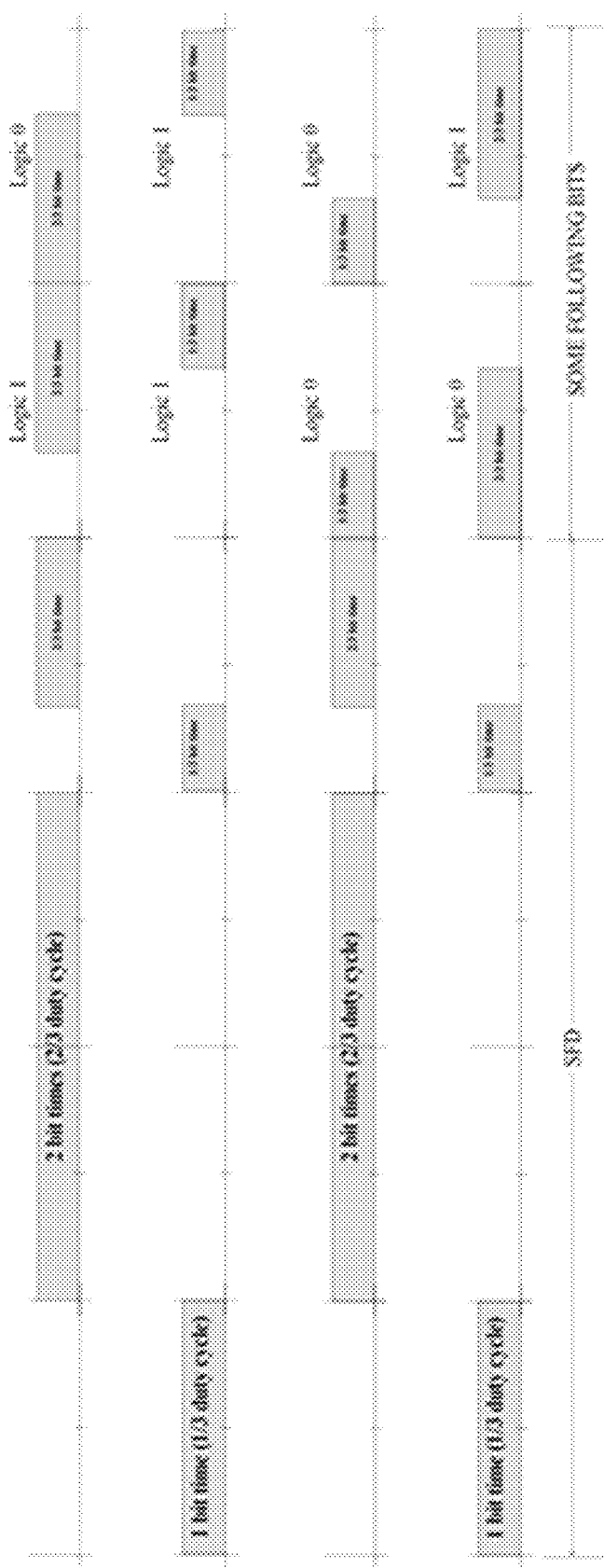
FIG. 26 illustrates a mixture of SFD types and data bit types.

FIG. 26 illustrates a mixture of SFD types and data bit types. FIG. 26 shows the two SFD types with some following bits. The first and the third lines are the ⅔ duty cycle SFD followed by bit patters 10 and 00 respectively. Likewise, the second and fourth lines show the ⅓ duty cycle SFD followed by bit patterns 11 and 01 respectively.

Figure 27:
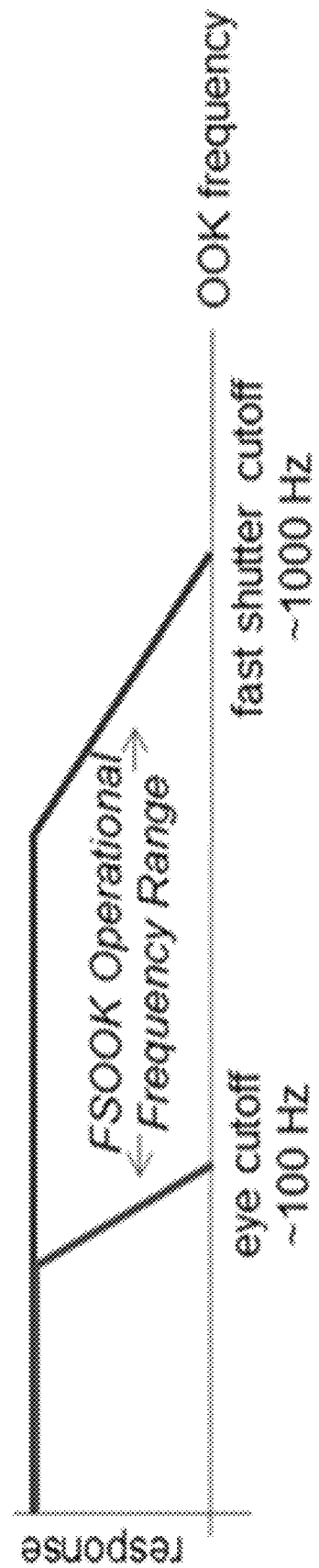
FIG. 27 illustrates an exemplary embodiment of sample frequency shift ON OFF keying.

FIG. 27 illustrates an exemplary embodiment of sample frequency shift ON OFF keying. In regards to the observability of a "blinking light", the UFOOK waveform transitions can be seen by a camera with the appropriate exposure setting, but not by the human eye, due to the fact that the camera's exposure setting can be much faster than the eye as shown in FIG. 28.

The human eye has a cutoff frequency in the vicinity of 100 Hz, whereas the camera's cutoff response can significantly exceed 100 Hz depending upon the exposure speed setting (integration time). Under intense light conditions the exposure can be set to well under 1 ms and still result in satisfactory performance. As suspected, the techniques described herein require a relatively intense light source (i.e. high SNR).

Figure 28:
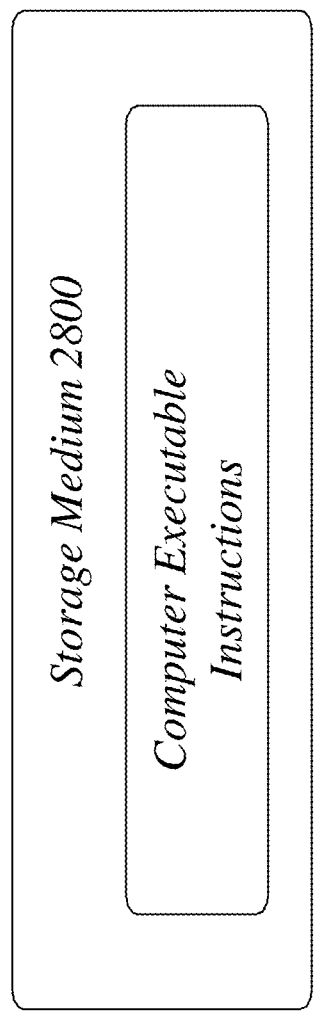
FIG. 28 illustrates an embodiment of a storage medium.

FIG. 28 illustrates an embodiment of a storage medium 2800. Storage medium 2800 may comprise any non-transitory computer-readable storage medium or machine-readable storage medium, such as an optical, magnetic or semiconductor storage medium. In various embodiments, storage medium 2800 may comprise an article of manufacture. In some embodiments, storage medium 2800 may store computer-executable instructions, such as computer-executable instructions to implement the SFD acquisition algorithm. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 29:
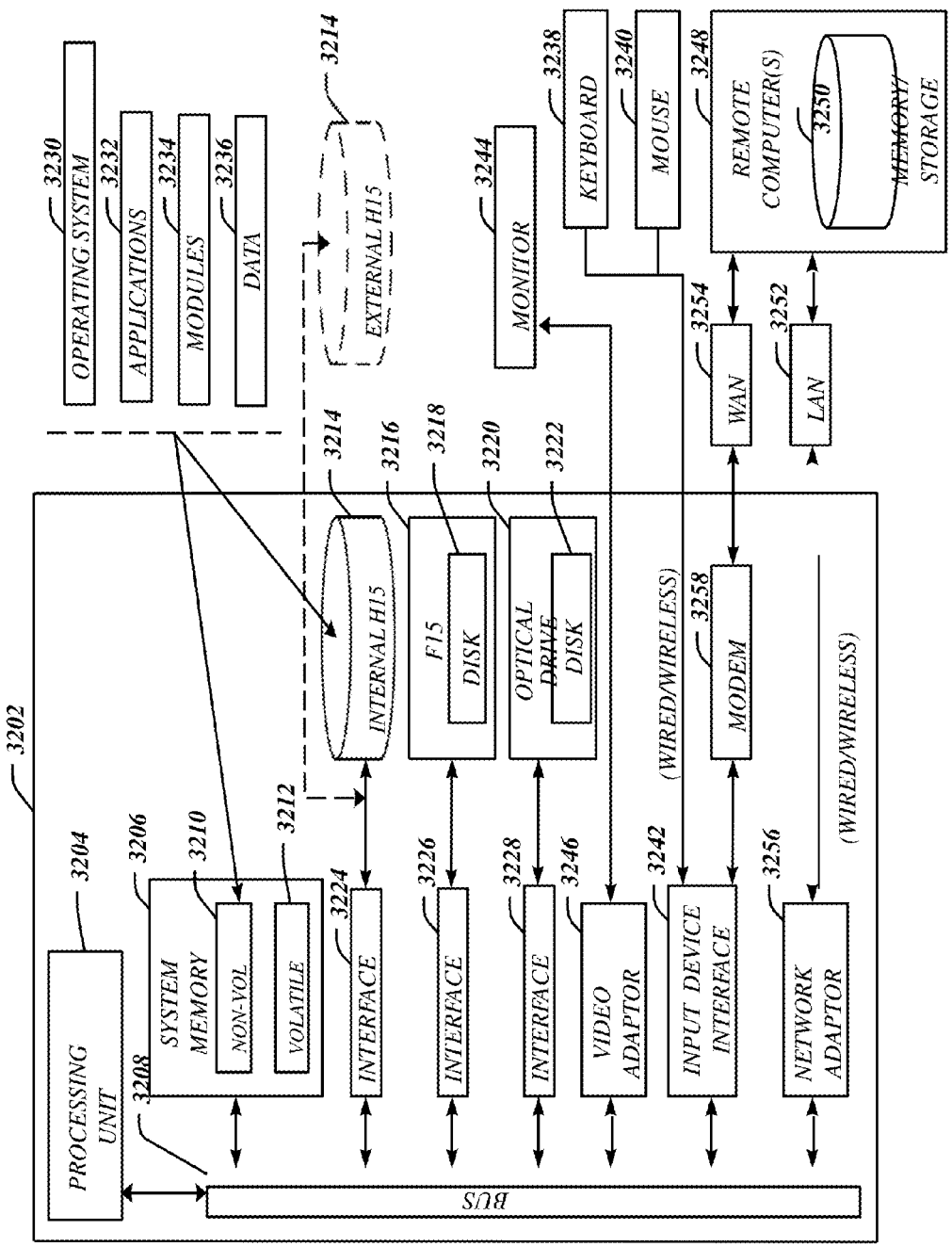
FIG. 29 illustrates an embodiment of a computing architecture.

FIG. 29 illustrates an embodiment of an exemplary computing architecture 3200 that may be suitable for implementing various embodiments as previously described. In various embodiments, the computing architecture 3200 may comprise or be implemented as part of an electronic device. In some embodiments, the computing architecture 3200 may be representative, for example, of a processor or server that implements one or more components of the optical wireless communication system. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 3200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 3200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 3200.

As shown in FIG. 29, the computing architecture 3200 comprises a processing unit 3204, a system memory 3206 and a system bus 3208. The processing unit 3204 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 3204.

The system bus 3208 provides an interface for system components including, but not limited to, the system memory 3206 to the processing unit 3204. The system bus 3208 can be any of several types of bus structure that may further interconnect to a memory bus (with or without a memory controller), a peripheral bus, and a local bus using any of a variety of commercially available bus architectures. Interface adapters may connect to the system bus 3208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 3206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 32, the system memory 3206 can include non-volatile memory 3210 and/or volatile memory 3212. A basic input/output system (BIOS) can be stored in the non-volatile memory 3210.

The computer 3202 may include various types of computer-readable storage media in the form of one or more lower speed memory units, including an internal (or external) hard disk drive (HDD) 3214, a magnetic floppy disk drive (FDD) 3216 to read from or write to a removable magnetic disk 3218, and an optical disk drive 3220 to read from or write to a removable optical disk 3222 (e.g., a CD-ROM or DVD). The HDD 3214, FDD 3216 and optical disk drive 3220 can be connected to the system bus 3208 by a HDD interface 3224, an FDD interface 3226 and an optical drive interface 3228, respectively. The HDD interface 3224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 3210, 3212, including an operating system 3230, one or more application programs 3232, other program modules 3234, and program data 3236. In one embodiment, the one or more application programs 3232, other program modules 3234, and program data 3236 can include, for example, the various applications and/or components of the optical wireless communication system.

A user can enter commands and information into the computer 3202 through one or more wire/wireless input devices, for example, a keyboard 3238 and a pointing device, such as a mouse 3240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 3204 through an input device interface 3242 that is coupled to the system bus 3208, but can be connected by other interfaces such as a parallel port, IEEE 1394 serial port, a game port, a USB port, an IR interface, and so forth.

A monitor 3244 or other type of display device is also connected to the system bus 3208 via an interface, such as a video adaptor 3246. The monitor 3244 may be internal or external to the computer 3202. In addition to the monitor 3244, a computer typically includes other peripheral output devices, such as speakers, printers, and so forth.

The computer 3202 may operate in a networked environment using logical connections via wire and/or wireless communications to one or more remote computers, such as a remote computer 3248. The remote computer 3248 can be a workstation, a server computer, a router, a personal computer, portable computer, microprocessor-based entertainment appliance, a peer device or other common network node, and typically includes many or all of the elements described relative to the computer 3202, although, for purposes of brevity, only a memory/storage device 3250 is illustrated. The logical connections depicted include wire/wireless connectivity to a local area network (LAN) 3252 and/or larger networks, for example, a wide area network (WAN) 3254. Such LAN and WAN networking environments are commonplace in offices and companies, and facilitate enterprise-wide computer networks, such as intranets, all of which may connect to a global communications network, for example, the Internet.

When used in a LAN networking environment, the computer 3202 is connected to the LAN 3252 through a wire and/or wireless communication network interface or adaptor 3256. The adaptor 3256 can facilitate wire and/or wireless communications to the LAN 3252, which may also include a wireless access point disposed thereon for communicating with the wireless functionality of the adaptor 3256.

When used in a WAN networking environment, the computer 3202 can include a modem 3258, or is connected to a communications server on the WAN 3254, or has other means for establishing communications over the WAN 3254, such as by way of the Internet. The modem 3258, which can be internal or external and a wire and/or wireless device, connects to the system bus 3208 via the input device interface 3242. In a networked environment, program modules depicted relative to the computer 3202, or portions thereof, can be stored in the remote memory/storage device 3250. It will be appreciated that the network connections shown are exemplary and other means of establishing a communications link between the computers can be used.

The computer 3202 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 30:
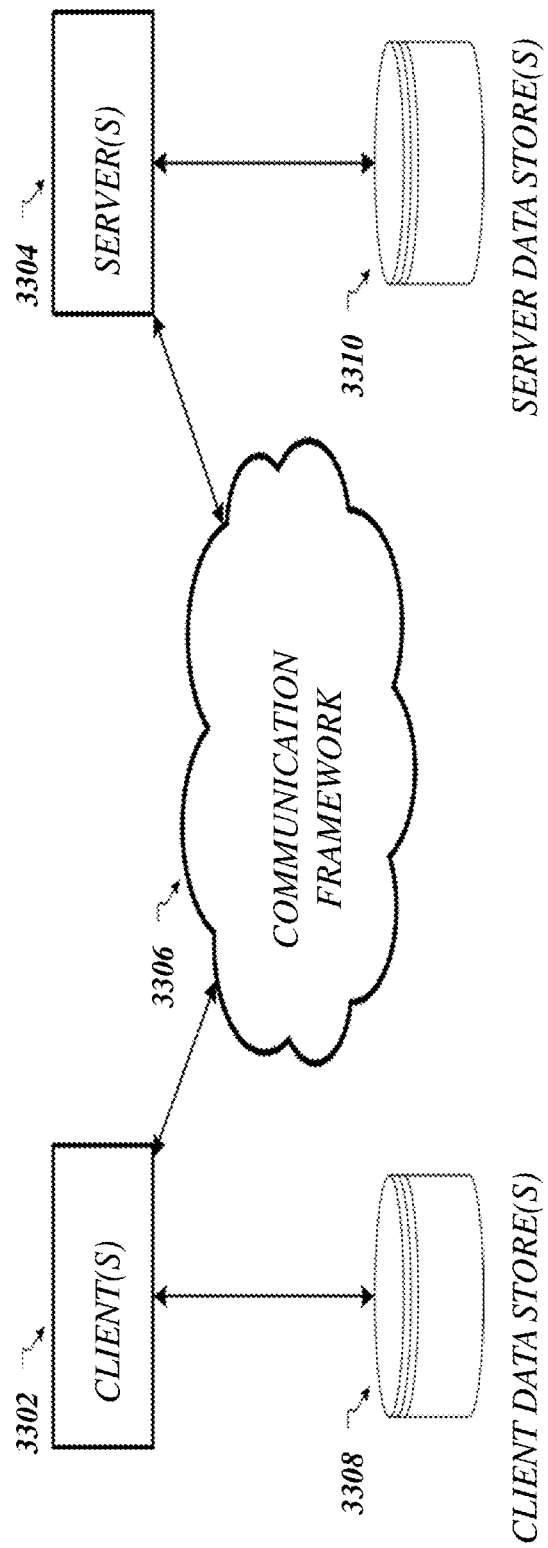
FIG. 30 illustrates an embodiment of a communications architecture.

FIG. 30 illustrates a block diagram of an exemplary communications architecture 3300 suitable for implementing various embodiments as previously described. The communications architecture 3300 includes various common communications elements, such as a transmitter, receiver, transceiver, radio, network interface, baseband processor, antenna, amplifiers, filters, power supplies, and so forth. The embodiments, however, are not limited to implementation by the communications architecture 3300.

As shown in FIG. 30, the communications architecture 3300 comprises includes one or more clients 3302 and servers 3304. The client(s) 302 and the servers 3304 are operatively connected to one or more respective client data stores 3308 and server data stores 3310 that can be employed to store information local to the respective clients 3302 and servers 3304, such as cookies and/or associated contextual information. In various embodiments, any one of servers 3304 may implement one or more of logic flows 1000, 1200-1700 of FIGS. 10, 12-16, and storage medium 3100 of FIG. 31 in conjunction with storage of data received from any one of clients 3302 on any of server data stores 3310.

The client(s) 3302 and the servers 3304 may communicate information between each other using a communication framework 3306 such as in an optical wireless communication system. The communications framework 3306 may implement any well-known communications techniques and protocols. The communications framework 3306 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 3306 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types such as an optical wireless communication network. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 3302 and the servers 3304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following embodiments are presented to illustrate exemplary and non-limiting embodiments of the disclosure.

Example 1 is directed to a receiver circuitry to decode asynchronous optical data from a pixel, the receiver comprising: a shift register having a plurality of storage cells, each storage cell configured to receive and store one byte of data per clock cycle, each byte of data representing a pixel state; a first plurality of comparator logic gates to correspond to a first group of the shift register storage cells and a second plurality of comparator logic gates to correspond to a second group of the shift register storage cells, each of the plurality of the first and the second logic gates to determine the pixel state at a respective clock cycle; and a Start Frame Delimiter (SFD) combinational logic to communicate with the first and the second plurality of comparator logics, the SFD combinational logic configured to implement a Boolean expression to identify receipt of an SFD signal at the pixel.

Example 2 is directed to the receiver circuitry of example 1, wherein the shift register defines a 16 bit shift register having 16 storage cells.

Example 3 is directed to the receiver circuitry of any preceding example, further comprising an Inter-Symbol-Interference (ISI) detection circuitry to determine a rise time and a fall time detected at the pixel.

Example 4 is directed to the receiver circuitry of any preceding example, further comprising a bit decision logic circuitry to communicate with the ISI detection circuitry to detect a sample phase with respect to pixel data over a plurality of clock cycles.

Example 5 is directed to the receiver circuitry of any preceding example, wherein the SFD combinational logic further comprises a first half selection processor and a second half selection processor, the first half selection processor to communicate with a third plurality of shift register storage cells to identify storage cells of the third plurality of storage cells with lowest ISI.

Example 6 is directed to the receiver circuitry of any preceding example, wherein the second half selection processor is configured to communicate with a fourth plurality of shift register storage cells to identify storage cells of the fourth plurality of storage cells with lowest ISI.

Example 7 is directed to a method for detecting start of asynchronous optical data received at a pixel, the method comprising: receiving a sequence of plurality of data bytes from a pixel and storing each of the plurality of data bytes at a respective plurality of byte storage cells, each data byte representing a pixel state at a respective clock cycle; for a first and a second plurality of storage cells, comparing the stored bytes with a threshold value to determine the pixel state at each of the respective clock cycles and to determine a plurality of first and second compared values; detecting a Start Frame Delimiter (SFD) by applying Boolean expression to each of the first and the second plurality of the first and second compared values.

Example 8 is directed to the method of example 7, further comprising receiving and storing 16 data bytes consecutively at each of a respective 16 clock cycles.

Example 9 is directed to the method of any preceding example, detecting Inter-Symbol-Interference (ISI) to determine a rise time and a fall time of an optical data signal at the pixel.

Example 10 is directed to the method of any preceding example, further comprising communicating the detected ISI to identify a sample phase over a plurality of clock cycles.

Example 11 is directed to the method of any preceding example, further comprising identifying the plurality of stored data bytes with least ISI.

Example 12 is directed to an optical transmission system, comprising: a light source to alternate between a first state having a first duty cycle and a second state having a second duty cycle, each duty cycle having a time span less than a bit transmission period; a controller circuitry to direct light transmission from the light source, the controller circuitry configured to: determine a concurrent light transmission state, direct the light source to transmit a Start Frame Delimiter (SFD), the SFD including a start flag portion followed by a logic symbol portion, wherein the start flag portion is about two-third of the length of the SFD transmission and the logic symbol is about one-third of the SFD transmission length and wherein the start flag portion defines a light state opposite the concurrent light transmission state.

Example 13 is directed to the optical transmission system of example 12, wherein the SFD is about 4 bit periods.

Example 14 is directed to the optical transmission system of any preceding example, wherein the logic symbol portion immediately follows the start flag portion and comprises a plurality of characters to indicate start of down-sampling phase.

Example 15 is directed to the optical transmission system of any preceding example, wherein a first character of the logic symbol portion is substantially opposite of a last character of the start flag portion.

Example 16 is directed to the optical transmission system of any preceding example, wherein the first duty cycle is about one-third (⅓) and the second duty cycle is about two-third (⅔) of a bit transmission time.

Example 17 is directed to the optical transmission system of any preceding example, wherein light transmission in the first and the second states define a variable position pulse modulation (VPPM).

Example 18 is directed to the optical transmission system of any preceding example, wherein the controller circuitry further comprises one or more processor circuitry and one or more memory circuitry.

Example 19 is directed to the optical transmission system of any preceding example, wherein the light source is a Light Emitting Diode (LED).

Example 20 is directed to a tangible machine-readable non-transitory medium comprising instructions, which when executed by one or more processors results in performing operations comprising: determine a concurrent light transmission state of a light source, direct the light source to transmit a Start Frame Delimiter (SFD), the SFD including a start flag portion followed by a logic symbol portion, wherein the start flag portion is about two-third of the length of the SFD transmission and the logic symbol is about one-third of the SFD transmission length and wherein the start flag portion defines a light state opposite the concurrent light transmission state.

Example 21 is directed to the medium of example 20, wherein the SFD is about 4 bit periods.

Example 22 is directed to the medium of any preceding example, wherein the logic symbol portion immediately follows the start flag portion and comprises a plurality of characters to indicate start of down-sampling phase.

Example 23 is directed to the medium of any preceding example, wherein a first character of the logic symbol portion is substantially opposite of a last character of the start flag portion.

Example 24 is directed to the medium of any preceding example, wherein the first duty cycle is about one-third (⅓) and the second duty cycle is about two-third (⅔) of a bit transmission time.

Example 25 is directed to the medium of any preceding example, wherein light transmission in the first and the second states define a variable position pulse modulation (VPPM).

Example 26 is directed a device for detecting start of asynchronous optical data received at a pixel, the device comprising: means for receiving a sequence of plurality of data bytes from a pixel and storing each of the plurality of data bytes at a respective plurality of byte storage cells, each data byte representing a pixel state at a respective clock cycle; for a first and a second plurality of storage cells, means for comparing the stored bytes with a threshold value to determine the pixel state at each of the respective clock cycles and to determine a plurality of first and second compared values; means for detecting a Start Frame Delimiter (SFD) by applying Boolean expression to each of the first and the second plurality of the first and second compared values.

Example 27 is directed to the device of example 26, further comprising means for receiving and storing 16 data bytes consecutively at each of a respective 16 clock cycles.

Example 28 is directed to the device of any preceding example, wherein the means for detecting Inter-Symbol-Interference (ISI) determines a rise time and a fall time of an optical data signal at the pixel.

Example 29 is directed to the device of any preceding example, further comprising means for communicating the detected ISI to identify a sample phase over a plurality of clock cycles.

Example 30 is directed to the device of any preceding example, further comprising means for identifying the plurality of stored data bytes with least ISI.

Example 31 is directed to an optical transmission system, comprising: a lighting means to alternate between a first state having a first duty cycle and a second state having a second duty cycle, each duty cycle having a time span less than a bit transmission period; a controlling means for directing light transmission from the lighting means, the controlling means configured to: determine a concurrent light transmission state, direct the light source to transmit a Start Frame Delimiter (SFD), the SFD including a start flag portion followed by a logic symbol portion, wherein the start flag portion is about two-third of the length of the SFD transmission and the logic symbol is about one-third of the SFD transmission length and wherein the start flag portion defines a light state opposite the concurrent light transmission state.

Example 32 is directed to the optical transmission system of example 31, wherein the SFD is about 4 bit periods.

Example 33 is directed to the optical transmission system of any preceding example, wherein the logic symbol portion immediately follows the start flag portion and comprises a plurality of characters to indicate start of down-sampling phase.

Example 34 is directed to the optical transmission system of any preceding example, wherein a first character of the logic symbol portion is substantially opposite of a last character of the start flag portion.

Example 35 is directed to the optical transmission system of any preceding example, wherein the first duty cycle is about one-third (⅓) and the second duty cycle is about two-third (⅔) of a bit transmission time.

Example 36 is directed to the optical transmission system of any preceding example, wherein light transmission in the first and the second states define a variable position pulse modulation (VPPM).

Example 37 is directed to the optical transmission system of any preceding example, wherein the controlling means further comprises one or more processor circuitry and one or more memory circuitry.

Example 38 is directed to the optical transmission system of any preceding example, wherein the lighting means is a Light Emitting Diode (LED).

While the principles of the disclosure have been illustrated in relation to the exemplary embodiments shown herein, the principles of the disclosure are not limited thereto and include any modification, variation or permutation thereof.

What is claimed is:

1. A receiver circuitry to decode asynchronous optical data from a pixel, the receiver comprising:
   a shift register having a plurality of storage cells, each storage cell configured to receive and store one byte of data per clock cycle, each byte of data representing a pixel state;
   a first plurality of comparator logic gates to correspond to a first group of the shift register storage cells and a second plurality of comparator logic gates to correspond to a second group of the shift register storage cells, each of the plurality of the first and the second logic gates to determine the pixel state at a respective clock cycle; and
   a Start Frame Delimiter (SFD) combinational logic to communicate with the first and the second plurality of comparator logics, the SFD combinational logic configured to implement a Boolean expression to identify receipt of an SFD signal at the pixel.

2. The receiver circuitry of claim 1, wherein the shift register defines a 16 bit shift register having 16 storage cells.

3. The receiver circuitry of claim 2, further comprising an Inter-Symbol-Interference (ISI) detection circuitry to determine a rise time and a fall time detected at the pixel.

4. The receiver circuitry of claim 3, further comprising a bit decision logic circuitry to communicate with the ISI detection circuitry to detect a sample phase with respect to pixel data over a plurality of clock cycles.

5. The receiver circuitry of claim 2, wherein the SFD combinational logic further comprises a first half selection processor and a second half selection processor, the first half selection processor to communicate with a third plurality of shift register storage cells to identify storage cells of the third plurality of storage cells with lowest ISI.

6. The receiver circuitry of claim 5, wherein the second half selection processor is configured to communicate with a fourth plurality of shift register storage cells to identify storage cells of the fourth plurality of storage cells with lowest ISI.

7. A method for detecting start of asynchronous optical data received at a pixel, the method comprising:
   receiving a sequence of plurality of data bytes from a pixel and storing each of the plurality of data bytes at a respective plurality of byte storage cells, each data byte representing a pixel state at a respective clock cycle;
   for a first and a second plurality of storage cells, comparing the stored bytes with a threshold value to determine the pixel state at each of the respective clock cycles and to determine a plurality of first and second compared values;
   detecting a Start Frame Delimiter (SFD) by applying Boolean expression to each of the first and the second plurality of the first and second compared values.

8. The method of claim 7, further comprising receiving and storing 16 data bytes consecutively at each of a respective 16 clock cycles.

9. The method of claim 7, detecting Inter-Symbol-Interference (ISI) to determine a rise time and a fall time of an optical data signal at the pixel.

10. The method of claim 9, further comprising communicating the detected ISI to identify a sample phase over a plurality of clock cycles.

11. The method of claim 8, further comprising identifying the plurality of stored data bytes with least ISI.

* * * * *